(12) United States Patent
Cana et al.

(10) Patent No.: US 12,373,421 B2
(45) Date of Patent: Jul. 29, 2025

(54) SYSTEMS AND METHODS FOR REPORTING CLOUD STORAGE STATISTICS BY A CLOUD STORAGE SERVICE PROVIDER

(71) Applicant: Wasabi Technologies, Inc., Boston, MA (US)

(72) Inventors: Hasan Cana, Pristina (XK); Milot Shala, Pristina (XK); Vilas S. Belagodu, Winchester, MA (US); Ryan Benjamin Ripa, Shrewsbury, NJ (US)

(73) Assignee: Wasabi Technologies, Inc., Boston, MA (US)

( * ) Notice: Subject to any disclaimer, the term of this patent is extended or adjusted under 35 U.S.C. 154(b) by 43 days.

(21) Appl. No.: 18/174,097

(22) Filed: Feb. 24, 2023

(65) Prior Publication Data
US 2024/0289321 A1    Aug. 29, 2024

(51) Int. Cl.
*G06F 16/23*    (2019.01)
*G06F 9/54*    (2006.01)
*G06F 16/27*    (2019.01)
*G06F 16/54*    (2019.01)

(52) U.S. Cl.
CPC ......... *G06F 16/2365* (2019.01); *G06F 9/544* (2013.01); *G06F 16/27* (2019.01)

(58) Field of Classification Search
None
See application file for complete search history.

(56) References Cited

U.S. PATENT DOCUMENTS

| | | | |
|---|---|---|---|
| 10,324,893 B1* | 6/2019 | Telang | G06F 11/14 |
| 2020/0036788 A1* | 1/2020 | Zhang | H04L 67/1097 |
| 2023/0137443 A1* | 5/2023 | Pandit | G06F 3/0644 |
| | | | 718/1 |

OTHER PUBLICATIONS

Jayant Baliga; Green Cloud Computing: Balancing Energy in Processing, Storage, and Transport; IEEE; pp. 1-19.*

* cited by examiner

*Primary Examiner* — Ann J Lo
*Assistant Examiner* — Jermaine A Mincey
(74) *Attorney, Agent, or Firm* — Foley & Lardner LLP

(57) ABSTRACT

The present solution is directed to systems and methods for reporting cloud storage statistics or reports by a cloud storage manager that can receive a request from a client of a managed service provider pertaining to use of cloud storage by the client. The request can include a domain identifier associated with the managed service provider. The cloud storage manager can transmit a request for a custom asset associated with the domain identifier to a first cloud storage service and receive the requested custom asset associated with the domain identifier. The cloud storage manager can request statistics regarding use of a second cloud storage service by the client and receive statistics regarding use of the second cloud storage service by the client. The cloud storage manager can render, using the retrieved custom asset and statistics, a customized page or a report displaying the cloud storage statistics or information.

20 Claims, 9 Drawing Sheets

Customized Page 124

| Company Name 302 | Company Logo 304 | | |
|---|---|---|---|
| Buckets 306 | | | Create Bucket |
| Search ... | | | |
| Bucket 306 | | Region 308 | Creation Time 310 |
| 08-december-2022 | | us-east-1 | 08-Dec-2022 02:38 PM |
| 09-december-2022 | | us-east-1 | 09-Dec-2022 10:26 AM |
| 10-december-2022 | | us-east-1 | 10-Dec-2022 04:14 PM |
| 13-april-2022 | | us-east-1 | 13-Apr-2022 10:59 AM |
| 13-december-2022 | | us-east-1 | 13-Dec-2022 02:19 PM |
| 14-decembar-2022 | | us-east-1 | 14-Dec-2022 12:15 PM |

Customized Page 124

400

Company Name 302 | Company Logo 304

Buckets

Search...

Create Bucket 404

Create Bucket Window 402

| Bucket |
|---|
| 08-december-2022 |
| 09-december-2022 |
| 10-december-2022 |
| 13-april-2022 |
| 13-december-2022 |
| 14-decembar-2022 |

Create Bucket

Bucket Name*

Select Region* ⌄

Bucket Versioning
When versioning is enabled, you can retrieve and restore any previous version of an object in the bucket. Note: version of objects are added to your total data storage costs.

Bucket Logging
When logging is enabled, a text log file of all access to a bucket is created Object Locking
Enabling Object lock will allow you to prevent objects from being overwritten or deleted for a fixed amount of time. Toggling this box will permanently enable Object lock functionality for the duration of the bucket's existence.

FIG. 4

SYSTEMS AND METHODS FOR REPORTING CLOUD STORAGE STATISTICS BY A CLOUD STORAGE SERVICE PROVIDER

INTRODUCTION

Cloud storage services can be used to store data for various types of clients on a network. Various service providers can provide client's cloud storage such as storing, retrieving, and managing of the client data. Sometimes, service provider can store client data on databases and cloud-based platforms. In such cases, typically, the service provider may prefer to maintain the storage locations unavailable to other parties.

SUMMARY

The present solution is generally directed to providing, by a cloud storage manager, cloud storage statistics or data reports to clients of managed service providers via pages or reports customized using assets of the managed service provider. When a provider of cloud-based services serves its clients, the provider can utilize cloud storage services to store and manage any client data on the cloud storage platforms. In such instances, the service provider can store data of its clients on a platform of a cloud storage manager. The cloud storage manager can in turn retrieve statistics on the stored data and provide access to the cloud storage statistics to any client of the managed service provider, upon the client request. The cloud storage manager can provide generated statistics using the domain name of the managed service provider. In such instances, the cloud storage manager can seamlessly respond to requests of the clients of the managed service provider for cloud storage statistics of the clients that are stored on behalf of the managed service provider. The cloud storage manager can utilize custom assets of the managed service provider to personalize pages or reports in which it can provide requested statistics or client data. In doing so, the cloud storage manager can generate customized pages or reports matching the theme and settings that the clients expect from their managed service providers. However, as custom assets and cloud storage statistics can be stored across various third-party cloud storage services or platforms, it may be difficult for the cloud storage manager to seamlessly respond to client requests for cloud storage statistics or reports via such customized pages. The present solution addresses this challenge by allowing the managing service provider to gain access to the remotely stored custom asset data and the separately stored cloud storage statistics, allowing the cloud storage manager to generate, under a domain name of the managed service provider, the customized page or the report listing the cloud storage statistics or the client's storage information.

At least one aspect is directed to a system for providing a customized cloud storage report. The system can include one or more processors coupled with memory. The one or more processors can receive, by a cloud storage manager, a request pertaining to a report on use of cloud storage of the cloud storage manager by a client of a managed service provider providing the cloud storage to the client. The request can include a domain identifier associated with the managed service provider. The one or more processors can transmit, by the cloud storage manager, a request for a custom asset associated with the domain identifier to a second cloud storage manager providing a second cloud storage storing the custom asset. The one or more processors can receive, from the second cloud storage manager, the requested custom asset associated with the domain identifier. The one or more processors can request, from a database of the cloud storage via an application programming interface (API) call, data on usage of the cloud storage by the client. The one or more processors can receive, from the database responsive to the API call, the data corresponding to a first storage amount of client information stored on the cloud storage and a second storage amount of client information deleted from the cloud storage within a retention period. The one or more processors can send, by the cloud storage manager to the client responsive to the request pertaining to the report, the report customized to include the data and the retrieved custom assets of the managed service provider.

At least one aspect is directed to a method of providing a customized cloud storage report. The method can include receiving, by one or more processors of a cloud storage manager, a request pertaining to a report on use of cloud storage of the cloud storage manager by a client of a managed service provider providing the cloud storage to the client. The request can include a domain identifier associated with the managed service provider. The method can include transmitting, by the one or more processors, a request for a custom asset associated with the domain identifier to a second cloud storage manager providing a second cloud storage storing the custom asset. The method can include receiving, by the one or more processors from the second cloud storage manager, the requested custom asset associated with the domain identifier. The method can include requesting, by the one or more processors from a database of the cloud storage via an application programming interface (API) call, data on usage of the cloud storage by the client. The method can include receiving, by the one or more processors from the database responsive to the API call, the data corresponding to a first storage amount of client information stored on the cloud storage and a second storage amount of client information deleted from the cloud storage within a retention period. The method can include sending, by the one or more processors, to the client responsive to the request pertaining to the report, the report customized to include the data and the retrieved custom assets of the managed service provider.

At least one aspect is directed to a non-transitory computer-readable medium comprising instructions. When executed the instructions can cause the one or more processors to receive a request pertaining to a report on use of cloud storage of the cloud storage manager by a client of a managed service provider providing the cloud storage to the client. The request can include a domain identifier associated with the managed service provider. The instructions can cause the one or more processors to transmit a request for a custom asset associated with the domain identifier to a second cloud storage manager providing a second cloud storage storing the custom asset. The instructions can cause the one or more processors to receive, from the second cloud storage manager, the requested custom asset associated with the domain identifier. The instructions can cause the one or more processors to request, from a database of the cloud storage via an application programming interface (API) call, data on usage of the cloud storage by the client. The instructions can cause the one or more processors to receive, from the database responsive to the API call, the data corresponding to a first storage amount of client information stored on the cloud storage and a second storage amount of client information deleted from the cloud storage within a retention period. The instructions can cause the one or more processors to send, to the client responsive to the request pertaining to the report, the report customized to include the data and the retrieved custom assets of the managed service provider.

At least one aspect is directed to a system for customized display of cloud storage statistics. The system can include one or more processors to receive a request from a client. The request can pertain to use of cloud storage by the client of a managed service provider. The request can include a domain identifier that can be associated with the managed service provider. The one or more processors can be configured to transmit a request for a custom asset associated with the domain identifier to a first cloud storage service. The one or more processors can receive, from the first cloud storage service, the requested custom asset associated with the domain identifier. The one or more processors can request, from a database via an application programming interface (API) call, statistics regarding use of a second cloud storage service by the client. The one or more processors can receive, from the second cloud storage service, statistics regarding use of a second cloud storage service by the client. The one or more processors can render, using the retrieved custom asset and statistics, a customized page displaying the cloud storage statistics.

At least one aspect is directed to a method of customized display of cloud storage statistics. The method can include an act of receiving, by one or more processors, a request from a client pertaining to use of cloud storage by the client of a managed service provider. The request can include a domain identifier associated with the managed service provider. The method can include transmitting, by the one or more processors, a request for a custom asset associated with the domain identifier to a first cloud storage service. The method can include receiving, by the one or more processors from the first cloud storage service, the requested custom asset associated with the domain identifier. The method can include requesting, by the one or more processors from a database via an application programming interface (API) call, statistics regarding use of a second cloud storage service by the client. The method can include receiving, by the one or more processors from the second cloud storage service, statistics regarding use of a second cloud storage service by the client. The method can include rendering, by the one or more processors using the retrieved custom asset and statistics, a customized page displaying the cloud storage statistics.

At least one aspect is directed to a non-transitory computer-readable medium comprising instructions. The instructions, when executed by one or more processors, can cause the one or more processors to receive, by a browser application of a managing service provider, a request from a client pertaining to use of cloud storage by the client of a managed service provider. The request can include a domain identifier associated with the managed service provider. The instructions can cause the one or more processors to transmit, by the browser application, a request for a custom asset associated with the domain identifier to a first cloud storage service. The instructions can cause the one or more processors to receive, by the browser application from the first cloud storage service, the requested custom asset associated with the domain identifier. The instructions can cause the one or more processors to request, by the browser application from a database via an application programming interface (API) call, statistics regarding use of a second cloud storage service by the client. The instructions can cause the one or more processors to receive, by the browser application from the second cloud storage service, statistics regarding use of a second cloud storage service by the client. The instructions can cause the one or more processors to render, by the browser application using the retrieved custom asset and statistics, a customized page displaying the cloud storage statistics.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3 depicts an example of a customized page generated using systems and methods described herein.

FIG. 4 depicts an example of another customized page generated using systems and methods described herein.

DETAILED DESCRIPTION

Figure 1A:
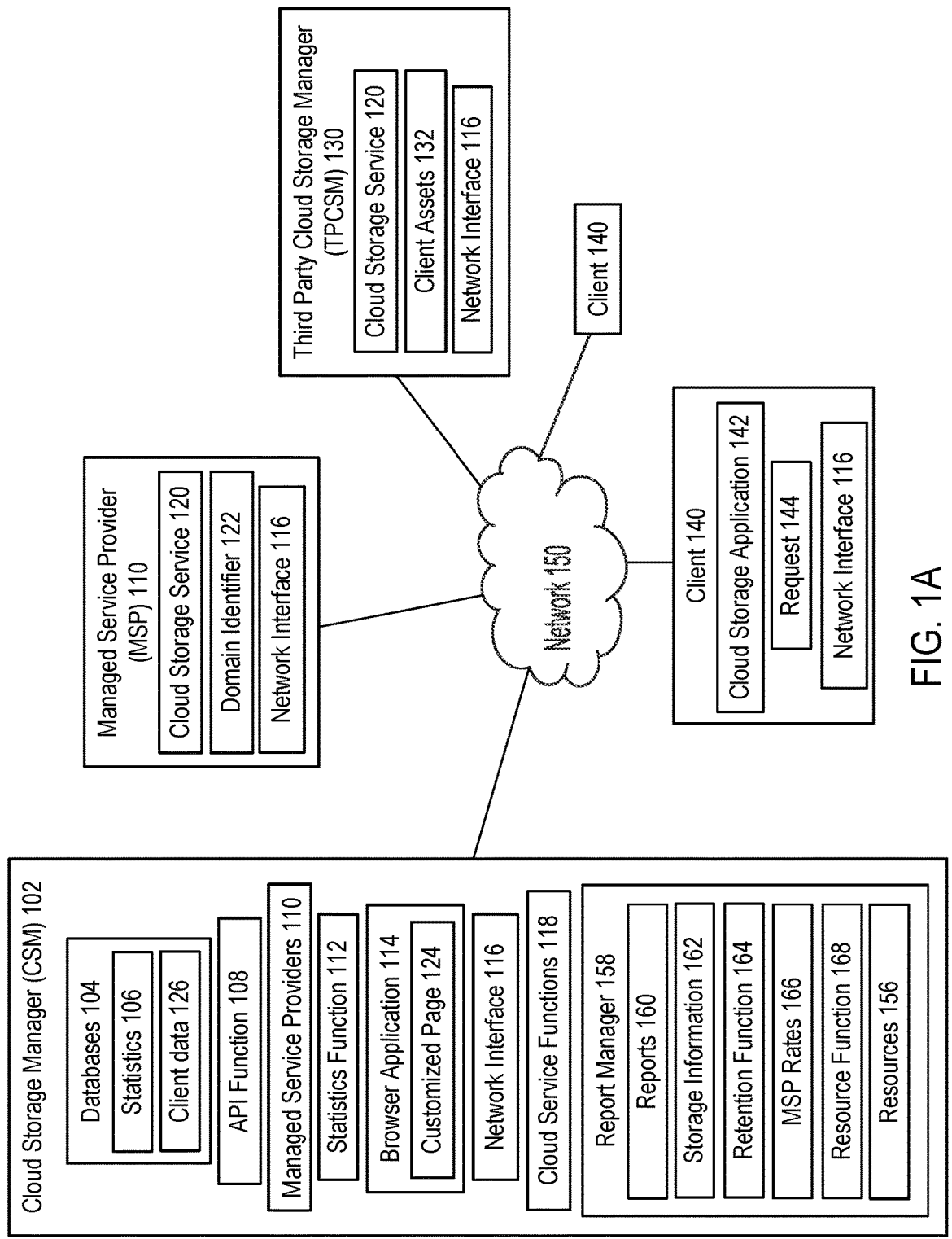
FIG. 1A is a block diagram illustrating an example of a system for generating a page customized using assets stored on a remote cloud storage platform and listing cloud storage statistics.

Following below are more detailed descriptions of various concepts related to, and implementations of, methods, apparatuses, and systems of providing data, statistics or information of clients of a managed service provider providing cloud storage of a back-end cloud storage manager to the clients. The various concepts introduced above and discussed in greater detail below may be implemented in any of numerous ways.

When client stores data in the cloud, the data can be stored in any number of cloud storage services or platforms. Some cloud-based applications or services can store client data in the cloud using services of cloud storage service provider that manage that data on behalf of the cloud-based applications or services. In such instances, the cloud-based application or services (e.g., a managed service provider) can rely on the cloud storage managed by another cloud storage service provider (e.g., a back-end cloud storage manager) to store, maintain and service the stored client's data. In such configurations, the managing cloud storage service provider (e.g., the cloud storage manager) can generate statistics on the client's stored data and provide the statistics to the client, upon the client's request. The cloud storage manager can also provide cloud storage data usage reports to the clients or the managed service providers, upon requests. In such instances, it can be beneficial for the managed service provider to have the managing cloud storage service provider to seamlessly provide the requested cloud storage statistics data or reports to the client using the managed service provider's customized themes and settings (e.g., web pages or storage usage reports having themes and settings of the managed service provider). In such configurations, as the managing service provider may not have access to both the statistics and the custom asset, it may be challenging for the managing cloud storage service provider to service such requests on behalf of the managed service provider providing the requested statistics in the page customized for the client.

The present solution addresses these challenges by providing the managing cloud storage service provider with the functionality to respond to the client's request for the cloud storage statistics data on behalf of the managed service provider by generating a customized page in which the client's requested cloud storage statistics are served with a domain name of the managed service provider. The present solution allows the managing cloud storage service provider to access the cloud storage statistics and the custom assets stored on the remote cloud storage service platform. The present solution allows the managing service provider to generate a page customized to the theme and format of the managed service provider that the client expects to receive and provide to the client the requested statistics in the customized page and under the domain name of the managed service provider. As a result, the present solution allows the managing service provider to provide cloud storage statistics data to the client using the domain identifier of the managed service provider and in a page that is customized to conform to the theme and settings of the managed service provider.

FIG. 1A depicts an example system 100 for providing, by a managing cloud storage service provider, cloud storage statistics in a page customized in accordance with the client's expectations using custom assets stored on remote cloud storage. The system 100 can also provide, by a managing cloud storage service provider, customized cloud storage reports pertaining to cloud storage usage by the clients of the managed service providers. For example, a managing cloud storage service provider, also referred to as the cloud storage manager (CSM) 102 can exchange communication with a managed service provider (MSP) 110, a third party cloud storage manager (TPCSM) 130 and one or more clients 140 via a network 150. A CSM 102 can include one or more databases 104 storing statistics 106 and client data 126. CSM 102 can include one or more application programming interface (API) functions 108, MSPs 110, statistics functions 112 and browser applications 114 with one or more customized pages 124. CSM 102 can also include one or more network interfaces 116 and cloud service functions 118. CSM 102 can also include a report manager 158 executing, including or providing reports 160, storage information 162, retention function 164, MSP rates 166, utilized resources 156 and a resource function 168. MSP 110 can include one or more cloud storage services 120, domain identifiers 122 and network interfaces 116. TPCSM 130 can include one or more cloud storage services 120, client assets 132 and network interfaces 116. Client 140 can include one or more cloud storage applications 142, requests 144 and network interfaces 116.

For example, FIG. 1A can refer to an embodiment of a system 100 in which a client 140 uses a cloud storage application 142 generating or accessing data (e.g., client data 126) that can be stored in the cloud (e.g., various cloud services or cloud storage platforms). Client 140 can make a request 144, via the cloud storage application 142, to a MSP 110 to access and view statistics 106 corresponding to the cloud storage services provided to the client 140 by the cloud storage services 120 of the MSP 110. The CSM can use the statistics function 112 to access and acquire the requested statistics 106 on client data 126 from databases 104 of the CSM 102. In order to present the requested statistics 106 in a customized page 124 arranged in accordance with the design and format expected by the client 140, the CSM 102 can use the API function 108 to access client's custom assets 132 from the TPCSM 130 and use the browser application 114 to generate the customized page 124 for the client 140 in accordance with the client's expectations, such as the format, color, logo, arrangement, settings or design that the client expects. The browser application 114 of the CSM 102 can provide the customized page 124 to the client 140 using the domain identifier 122 of the MSP 110, thereby allowing the client 140 to seamlessly access the cloud storage statistics 106 via the page 124 that is customized using the client assets 132.

For example, FIG. 1A can refer to an embodiment of a system 100 in which an MSP 110 or a client 140 sends a request for a report 160 on the cloud storage usage by the client 140. In response to the request for the report 160, CSM 102 can utilize a report manager 158 to access storage information 162 on the client data 126 (e.g., size of the currently stored client data 126, size of the deleted client data 126 or size of the deleted client data 126 that is still retained by the CSM 102 based on the retention function 164. Resource function 168 of the report manager 158 can utilize MSP rates 166 corresponding to the client 140 to determine the amount of utilized resources 156 by the client 140. Report manager 158 can generate or provide for the client 140, a report 160 indicating client storage information 162 and the amount of resources 156 of the client 140 utilized. The amount of resources 156 utilized can be determined according to the storage information 162 and the MSP rates 166 corresponding to the client 140.

Managing cloud storage service provider (CSM) 102 can be any cloud service provider storing data in the cloud. CSM 102 can include hardware and software for cloud computing and data storage across any number of devices dispersed across multiple geographic locations or regions. CSM 102 can include, or be coupled to, a computing device 800. CSM 102 can include one or more servers providing virtual server capability, memory and storage devices, each of which can be centrally located or dispersed across different geographic locations or areas and communicating via the network 150. CSM 102 can provide on-demand computer system resources, including for example, data storage and computing power. CSM 102 can provide services for managing and storing data in object storage services, managing data as objects or file systems or a file hierarchy. CSM 102 can provide object storage services, managing data as objects, rather than file systems.

Database 104 can include can include any organized collection of structured information or data stored in memory or storage devices. Database 104 can be stored in devices, such as memory 815, ROM 820 or storage devices 824. Database 104 can include or be deployed in a file system for organizing and storing data. Database 104 can include or be deployed on computer clusters or cloud storage a file system and/or tables for storing data. For example, database 104 can include client data, such as statistics 106. Database 104 can be managed by a databased management system to allow the database to interact with users and other functions, such as the statistics function 112.

Client data 126 can include any information or data generated by, corresponding to, involving or pertaining to a client 140. Client data 126 can include information identifying the client 140 or a user on the client 140. Client data 126 can include files, photos, image files, videos, media files, posts, emails, documents, spreadsheets, computer files, output files, web pages, papers, summaries or any other data of the client (e.g., generated by client 140) that can be stored in any cloud storage, or any data or information for accessing or using such data. Client data 126 can include computer processing files, cloud computing storage files, or any files, objects or data pertaining to a client 140. Client data 126 can include objects 502 stored in memory or storage or groups of objects 502 that can have common storage settings or configurations (e.g., buckets 306). For example, client data 126 can include buckets 306 comprising multiple objects 502 corresponding to files, documents or any form of data generated by client 140, stored by client 140 or stored on behalf of the client 140 on the cloud storage (e.g., databases 104) of the CSM 102.

Client data 126 can include any information, files or data for accessing other client data 126. For example, client data 126 can include authorization or authentication information for accessing files, such as username and passwords, secondary identification or authorization data, such as secondary phone numbers, emails or security questions and their corresponding answers. Client data 126 can include user account or sub-account information or data, access keys for accessing client information or data, such as client assets 132 on third party cloud service providers 130.

Statistics 106 can include any information corresponding to client data 126. Statistics 106 can include data describing or characterizing data stored in a database 104. Statistics 106 can include metadata on client data 126, including any structural metadata, descriptive metadata, preservation metadata, administrative metadata, provenance metadata, definitional metadata, uses of metadata or any other metadata about data stored. Metadata can include, for example, the author name, a date when data is created, a date when data is modified, a file size, a table of contents, page section and chapter numbering of data, physical characteristics of data, data on rights management, geographical region, prior versions of data or change to data over time, copyrights, access control or user requirements information, information on usage of data, archival of the data resources or rules or logic that can govern the data context or creation of derived data.

Statistics 106 can include statistics on cloud storage by the client 140 or by the MSP 110 and can be referred to as the cloud storage statistics 106. Statistics 106 can include the number of stored files, types of files stored, and number of files of each type, file names, total size of files individually or as a group, such as for example the total storage space utilized to store files of the client. Statistics 106 can include information on the files, storage size or timing of files stored per user, per user group or geographical region. Statistics 106 can include information on the data stored per MSP 110 or client 140, such as amount of memory dedicated to storage by the MSP 110 or client 140, geographic locations of the sites servicing files stored by the MSP 110 or client 140, as well as services or costs associated with the storage occupied by the data.

Statistics 106 can include objects 502. For example, an object 502 can include data stored in buffers allocated in Heap of a Java virtual machine or a piece of data stored in database 104. Statistics 106 can include buckets 306 that can include, relate to or correspond to a plurality of objects 502. For example, a bucket 306 can include one or more objects 502 having the same settings or configurations in relation to storage. For example, a bucket 306 can include one or more objects 502 sharing a common setting or configuration with respect to the storage retention, immutability, authentication or authorization. Statistics 106 can pertain to statistical data of the objects 506 or buckets 306. For example, statistics 106 can include rates, percentages, values or other information corresponding to stored data, including size of data, date of creation of data, author who created data, information of retention of data, information on storing or erasing data, geographical correlation with respect to data, rate of data storage, user access, application usage or access, or any other information on the stored data.

Application programming interface function 108, also referred to API function 108, can include any application or function allowing different systems, computer programs or applications to communicate or exchange data or information. API function 108 can include a combination of hardware and software allowing devices, functions, applications or services to exchange information or data, send requests or responses, or control communication. For example, API function can allow a browser application 114 to send API calls and receive responses to API calls to and from devices or functions, such as account control manager 220, MSP 110, TPCSM 130, clients 140, databases 104, cloud service function 118, statistics function 112 or cloud storage service 120. API function 108 can allow a function or an application, such as a browser application 114 to transmit send API calls to request and receive domain identifiers 112, client assets 132 or client data 224.

Managed Service Provider (MSP) 110 can include any service provider providing services to client. Managed service provider 110 can include any cloud computing or a cloud storage service provider. MSP 110 can include, or be coupled to, a computing device 800. For example, MSP 110 can include or provide a software as a service (SaaS), a platform as a service (PaaS), a desktop as a service (DaaS), managed software as a service (MSaaS), mobile backend as a service (MBaas), data center as a service (DCaaS), integration platform as a service (iPaaS) or information technology management as a service (ITMaaS). MSP 110 can include, utilize or work with a thin client and can operate in a multi-tenant architecture, serving multiple tenants, clients, functions or applications.

MSP 110 can manage, service, provide or store client data 126 using cloud computing services. For example, MSP 110 can provide services to the client, such as for example a SaaS service, and store client data 126 on a CSM 102. MSP 110 can utilize the cloud storage services 120 or cloud service functions 118 that can be deployed on the CSM 102 to provide storage to client data 126 to clients 140. MSP 110 can have, be associated with, or utilize, one or more domain identifiers 122 associated with the MSP 110 and can store data in association with the domain identifier 122. For example, MSP 110 can store client data 126 in association with a domain identifier 122 of the MSP 110 into database 104 of the CSM 102. MSP 110 can access and manage the client data 126 on the CSM 102 as needed, during the processing or servicing of the client data 126 or interacting with the client 140.

Statistics function 112 can include any function for accessing, providing, generating or managing statistics 106. Statistics function 112 can include a combination or hardware and software for maintaining statistics 106 for clients 140 or MSPs 110. Statistics function 112 can receive requests from the client 140 or MSPs 110 in connection with statistics 106. Statistics function 112 can access statistics 106 and provide accessed statistics 106 to the requesting clients 140 or MSPs 110.

Browser application 114 can include any application or a function for accessing websites or pages on a network 150. Browser application 114 can include combination of hardware and software for generating and providing web pages, such as a customized page 124. Browser application 114 can include the functionality to generate a customized page 124 in response to a client request 144. Browser application 114 can generate or build a customized page using statistics 106 stored in a local database 104 of a CSM. Browser application 114 can generate or build a customized page using client assets 132 stored in TPCSM 130. Browser application 114 can generate the customized page 124 to include a look and feel of a web page of a MSP 110, such as colors, logos, arrangement, menus, fonts and other characteristics and features of the MSP 110. Browser application 114 can generate the customized page 124 to include a look and feel of a web page of a client 140, including colors, logos, arrangement, menus, fonts and other characteristics and features of the client 140.

Browser application 114 can include back-end services 204 and front-end (e.g., web) application 202. The back-end services 204 and the front-end application 202 of the browser application 114 can be a single instance. For example, a single instance of the front-end application 202 and back-end services 204 can service one or more MSPs 110. Based on the given subdomain (e.g., MSPname.poweredbyCSMname.com) the CSM 102 can dynamically route the network traffic of such multiple MSPs 110 towards account control manager 220, authorization and access functions 222 and domain services 226 (e.g., Kubernetes) to service the front-end application 202 requests or network traffic based on the data on the clients 140, MSPs 110 or end users. Upon identifying the MSP 110, the browser application 114 can identify and access the custom assets 132 to load to address the client requests 144. In some embodiments, the back-end services 204 and the front-end application 202 of the browser application 114 can be run in multiple instances (e.g., one instance per each MSP 110 or client 140).

Network interface 116 can include any combination of hardware and software for communicating via a network 150. Network interface 116 can be deployed with, connected to, included in or otherwise coupled with any CSM 102, MSP 110, TPCSM 130 or client 140. Network interface 116 can include scripts, functions and computer code stored in memory and executed or operating on one or more processors (e.g., processors 810) to implement any network communication over a network 150. Network 150 can include any wired or wireless network, a communication cable or a cable for transmitting information or data, a World Wide Web, a local area network, a wide area network (e.g., the Internet), a Wi-Fi network, a Bluetooth network, a Cellular network, or any combination of wired and wireless networks on any communication platform or communication pathway for exchanging information or data. Network interface 116 can include functionality for communicating, via network 150, such as via any network communication protocol, including for example, Transmission Control Protocol (TCP)/Internet Protocol (IP), user datagram protocol (UDP), RF data communication protocols or standards such as Wi-Fi, Bluetooth, or cellular data network standards (e.g., 3G, 4G, 5G, 60 GHz, LTE, etc.) Network interface 116 can include communication ports and hardware for receiving and sending data and messages over the network 150. Network interface 116 can include the functionality to encode and decode, send and receive any information, commands, instructions, data structures, values, such as statistics 106, client data 126, client assets 132, domain identifiers 122 or any other information or data that can be transmitted between CSM 102, MSP 110, TPCSM 130 and client 140.

Cloud service function 118 can include any function for providing cloud related services. Cloud service function 118 can include any combination of hardware and software for providing cloud storage services to MSPs 110 or clients 140. Cloud service function 118 can include the functionality for interacting with MSP 110 and servicing data of the client 140 (e.g., client data 126) on the databases 104 of the CSM 102. Cloud service function 118 can provide seamless services and communication with the client 140 or cloud storage application 142 on the client 140 on behalf of the MSP 110 servicing the client 140. For example, cloud service function 118 can store client data 126 of the client application 142 on the client 140 on behalf of the MSP 110. Cloud service function 118 can keep track, maintain, access and provide the statistics 106 pertaining to the client data 126 in response to a request for the statistics 106 of the client 140 or MSP 110. Cloud service function 118 utilize API function 108 on behalf of the browser application 114 to access client assets 132 and statistics 106. Cloud service function 118 can provide the client assets 132 and statistics 106 to the browser function 114 to assemble the customized page 124.

Cloud storage service 120 can include any service by a MSP 110 involving cloud storage. Cloud storage service 120 can include any functionality involving storage of client data 126 on a CSM 102. For example, cloud storage service 120 can include a cloud computing function storing data from a cloud storage application 142. For example, cloud storage service can include a software as a service (SaaS), a platform as a service (PaaS), a desktop as a service (DaaS). Cloud storage service 120 can include a managed software as a service (MSaaS), mobile backend as a service (MBaas), data center as a service (DCaaS), integration platform as a service (iPaaS) or information technology management as a service (ITMaaS). Cloud storage service 120 can include any cloud-based function, application or a service to the clients 140 that utilizes, relies on or otherwise includes storage of data on the CSM 102 (e.g., storage of data pertaining to the client 140). Cloud storage service 120 can include an account control manager 220 for handling authorization, authentication and access for the client 140, provide domain services 226 and access to databases 104.

Domain identifier 122 can include any identifier of administrative autonomy, authority or control within the internet. Domain identifier 122 can identify services or locations on the internet, such as websites, web pages or portals. Domain identifier 122 can be associated with a MSP 110, a client 140, or a cloud storage service 120. Domain identifier 122 can include a string of characters identifying a web page, such as "https://www.xyzcompany.com/website/login" or "https://cloudcomputingcompany.ai/website/login."
Domain identifier 122 can include, list or identify a protocol for communication, such as "https://". Domain identifier 122 can include a domain name, such as "xyzcompany.com" or "cloudcomputingcompany.ai". Domain identifier 122 can include a second-level domain, such as "xyzcompany" or "cloudcomputingcompany", which can be a part of the domain name. Domain identifier 122 can include a top-level domain, such as ".com" or ".ai". Domain identifier 122 can include a subdirectory, such as "/website" and a path such as "/login". Domain identifier 122 can be Customized page 124 can include any page (e.g., web page) generated by the CSM 102. Customized page 124 can include any page generated or created by a browser application 114. The browser application 114 can generate the page utilizing a cloud service function 118 and a statistics function 112. Customized page 124 can include a webpage, or any other user interface that can be accessed, displayed and viewed using a browser application 114. Customized page 124 can include statistics 106, client data 126 and client assets 132.

Client assets 132 can include information or data for customizing the customized page 124 in accordance with client expectations, including the theme and settings of a web page or a web site. Client assets 132 can include features or characteristics, such as the colors, logos, images, media files, menus, page arrangements, fonts of the page or any other information, data or objects, for creating a page in a desired format (e.g., format customarily presented to the client 140 or MSP 110). Client assets 132 can include features and characteristics to create the format of pages of the MSP 110 website or pages of the client 140.

Third party cloud storage manager (TPCSM) 130 can include any storage service provider other than the CSM 102. TPCSM 130 can include, or be coupled to, a computing device 800. TPCSM 130 can include the CSM 102 and can include any functionality of a CSM 102. TPCSM 130 can include a computing device 800 and can utilize a network interface 116 to communicate over the network 150. TPCSM 130 can include storage for storing, on the locally managed cloud service, data of the clients. TPCSM 130 can include a cloud storage service provider utilizing cloud storage service 120 to locally store (e.g., on the cloud of the TPCSM 130) clients assets 132.

Client 140 can include any client device communicating over a network 150. Client 140 can include a smartphone, a tablet (e.g., Android tablet or an Apple iPad), a laptop or a desktop computer, a smart TV, a wearable device or any other device (e.g., having a computing device 800) that can be capable of operating a cloud storage application 142 and sending a request 144. Client 140 can include a network interface 116 via which the client 140 can communicate over the network 150 with CSM 102, MSP 110 or TPCSM 130. Client 140 can exchange, via the network 150, any data or information, such as the client assets 132, client data 126 or statistics 106. Client 140 can utilize cloud storage services 120 or cloud service functions 118 via cloud storage application 142.

Client storage application 142 can include any application that relies on, utilizes or otherwise communicates with cloud-based storage over the network 150. Client storage application 142 can be an application or a function operating on the client 140 and communicating via the network interface 116 with the MSP 110, CSM 102 or TPCSM 130. Client storage application 142 can include a function (e.g., a thin client, an agent or a web based application) for accessing, using or connecting with a cloud computing service over a network 150. For example, client storage application 142 can include a user application for generating, accessing or storing user's data (e.g., images, videos, media, files, documents or other information). Client storage application 142 can include a user's health related application, such as medical data application, health and exercise application for a smart watch, video or audio streaming application, email application, instant messenger application, a web browsing application, a word processing application or any other application that can be run on a client device 140. Client storage application 142 can include, connect to, couple with or utilize any cloud computing or cloud-based service, such as any SaaS, PaaS, MSaaS, MBaaS, DCaaS, iPaaS or ITMaaS. Client storage application 142 can issue requests 144 to remote applications, services or functions.

Request 144 can include any request from a client 140. Request 144 can include a request to access information on data stored in a database of a cloud storage system or service. Request 144 can include a request from a client storage application 142. Request can include an API call, a connection request or a session request. Request 144 can include a request to access statistics 106, client data 126 or client assets 132. Request 144 can include a request with a domain identifier 122 for a particular web page in which the client 140 can access statistics 106.

Reports 160 can include any document or file relating usage of cloud storage by a client 140. For example, a report 160 can include a daily, weekly, monthly or annual report, report or statement corresponding to the cloud storage usage by a client 140. Report 160 can include a cloud storage usage statement, invoice, a summary or a report corresponding to, listing, summarizing or otherwise describing amount of memory on cloud storage (e.g., in terms of bytes, kilobytes, megabytes, gigabytes or terabytes) that is used, taken or occupied by client data 126 stored on the databases 104 of the CSM 102. Report 160 can list or indicate amount of resources 156 used, spent or corresponding to the stored client data 126. Report 160 can include an MSP rate 166 corresponding to the client 140. Report 160 can include an amount of resources 156 used, spent or corresponding to the client data 126 used, stored or occupied by the client on the CSM 102 in accordance with the MSP rate 166 of the MCP 110.

Report manager 158 can include any combination of hardware and software for creating, generating, providing or otherwise compiling a report 160. Report manager 158 can include functions, programs or computer code for determining amount of storage (e.g., gigabytes of memory) occupied, filled or otherwise taken by client data 126 (e.g., client files or information) on the databases 104 (e.g., storage information 162). Report manager 158 can include the functionality to identify all memory locations storing client data 126 of a particular one or more clients 140 (e.g., storage information 162) and compiling the amount of storage corresponding to such identified memory locations. Report manager 158 can include the functionality to identify deleted by still retained client data 126. Report manager 158 can include the functionality to determine resources 156 of the client 140 utilized for the client data 126. Storage information 162 can include any data or compilation of data (e.g., metadata) on the size of information stored by the client 140. Storage information 162 can include a data identifying an amount of memory occupied by client data 162. Storage information 162 can include an amount of information (e.g., gigabytes of data) corresponding to client data 162 of one or more clients 140 (e.g., all clients 140 of an MSP 110 or a single client 140 of an MSP 110) currently stored in the cloud storage (e.g., databases 104) of the CSM 102. Storage information 162 can include an amount of information (e.g., gigabytes of data) corresponding to client data 162 of one or more clients 140 deleted from the cloud storage. Storage information 162 can include an amount of client data 126 deleted but still retained due to the retention period not being passed (e.g., data being deleted for a shorter period of time than the retention period). Storage information 162 can include an amount of information (e.g., gigabytes of data) corresponding to client data 162 of one or more clients 140 deleted from the cloud storage and no longer occupying memory as the data has passed (e.g., exceeded) the retention period. Storage information 162 can include an amount of information of a particular type of data of the client 140, such as an amount of encrypted client data 162, an amount of client data 162 corresponding to media files, an amount of client data 162 corresponding to confidential documents, an amount of client data 162 corresponding to backup files or any other type of client data 162.

Retention function 164 can include any function determining which deleted client data 162 has passed the retention period and which has not (e.g., can still be accessed or undeleted). For example, retention function 164 can establish, set up or reset a retention period (e.g., a period of time after which the deleted data can no longer be undeleted). Retention function 164 can determine that a first subset of data has been deleted passed its retention period (e.g., up to 7 days, 14 days, 30 days, 60 days, 90 days or 120 days). The first subset of data can therefore be permanently removed from the cloud storage of the CSM 102 and may not occupy any storage. For example, retention function 164 can determine that a second subset of data has been deleted for less than its retention period (e.g., up to 7 days, 14 days, 30 days, 60 days, 90 days or 120 days). The second subset of data can still occupy the cloud storage of the CSM 102 as the user on the client 140 may still undue the deletion of such client data 162.

MSP rates 166 can include any rates of utilization of resources 156. MSP rates 166 can include any rates of values or resources corresponding to amount of client data 126 stored on the cloud storage (e.g., databases 104) of the CSM 102 per unit of time (e.g., a time period of a month). For example, an MSP rate 166 can include a rate of costs or charges per amount of storage (e.g., gigabytes of memory) per time period (e.g., per week, per month or per year). For example, an MSP rate 166 can include a rate or amount of resources 156 used for each amount of storage (e.g., gigabyte of client data 126) stored in a database 104 of the CSM 102. An MSP rate 166 can include a rate of consumption of available storage (e.g., per gigabyte) for a client 140. An MSP rate 166 can include a rate corresponding to all clients 140 of an individual MSP 110, each individual client 140 or a group of clients managed by an MSP 110. For example, a first MSP rate 166 can include a first rate of values for each unit of storage by clients 140 of the first MSP 110 and a second MSP rate 166 can include a second rate of values for each unit of storage by clients 140 of the second MSP 110.

Resources 156 can include any property, reserves or assets of a client 140. A resource 156 can include an amount of storage available for use by a client 140. For example, a resource can include a memory storage size that a client 140 can use for storing client data 126. A resource 156 can include a capital or legal tender for the cloud storage used, occupied or accessed by the client 140 for storing client data 126. Resource 156 can include an available balance, credit or count corresponding to the amount of storage of the client data 126 on the database 104 of the CSM 102.

Resource function 168 can include any function for utilizing MSP rate 166 to determine the amount of resources 156 utilized for storing client data 126. For example, resource function 169 can use MSP rate 166 of a first MSP 110 to determine amount of resources 156 used by a client 140 of the MSP for storing client data 126 over a period of time (e.g., month or a year). For example, resource function 168 can identify an MSP rate 166 for an MSP 110 of a given client 140 and use the identified MSP rate 166 to determine the amount of resources 156 utilized by the client 140 over a course of a time period. Resource function 168 can use a first MSP rate 166 for a first type of storage information 162 (e.g., secured using a first type of encryption) and a second MSP rate 166 for a second type of storage information 162 (e.g., non-encrypted or secured using a second type of encryption).

Figure 1B:
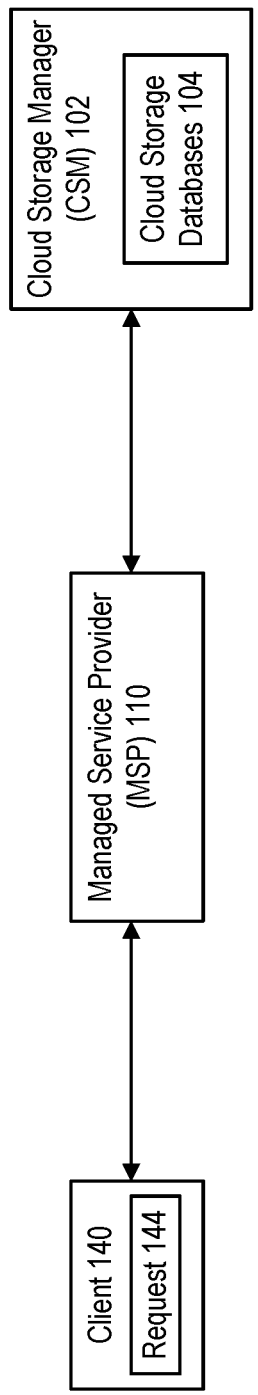
FIG. 1B is another block diagram illustrating an example of a system for generating a page customized using in which the managed service provider is disposed between the client and the cloud storage manager.

FIG. 1B depicts an example of a system 170 in which the client 140 communicates with an MSP 110 and the MSP 110 communicates with CSM 102 on the backend. Client 140 can communicate with the MSP 110 for the purposes of using the cloud services provided by the MSP 110, whereas the MSP 110 can communicate with the CSM 102 for the purposes of having the CSM 102 provide the cloud storage for the clients 140 of MSP 110. The MSP 110 may provide various cloud-based services to the clients 140, while outsourcing a part, or all, of the client's cloud storage to the CSM 102.

In such a configuration, MSP 110 may prefer to appear to the client 140 as though the client data 126 that is generated by the MSP 110 is handled by the MSP 110. MSP 110 may also prefer to have any responses to requests from the client 140 pertaining to the cloud storage at the CSM 102 appear as though they were provided by the MSP 110. For example, the MSP 110 may prefer that a response to a client request 144 for the cloud storage statistics 106 be provided by the CSM 102 using the domain identifier 122 (e.g., domain name) of the MSP 110. Moreover, MSP 110 may prefer that the requested statistics 106 be provided in pages (e.g., web pages) that are customized in accordance with themes and settings of pages of the MSP 110. Accordingly, the CSM 102 may provide, to the client 140, responses to requests 144 having the statistics 106 presented in pages that are customized to appear as the pages of the MSP 110 (e.g., using the custom assets 132 of the MSP 110) as well as the domain identifier (e.g., domain name) of the MSP 110, thereby appearing as though the response is coming from the MSP 110.

Figure 2:
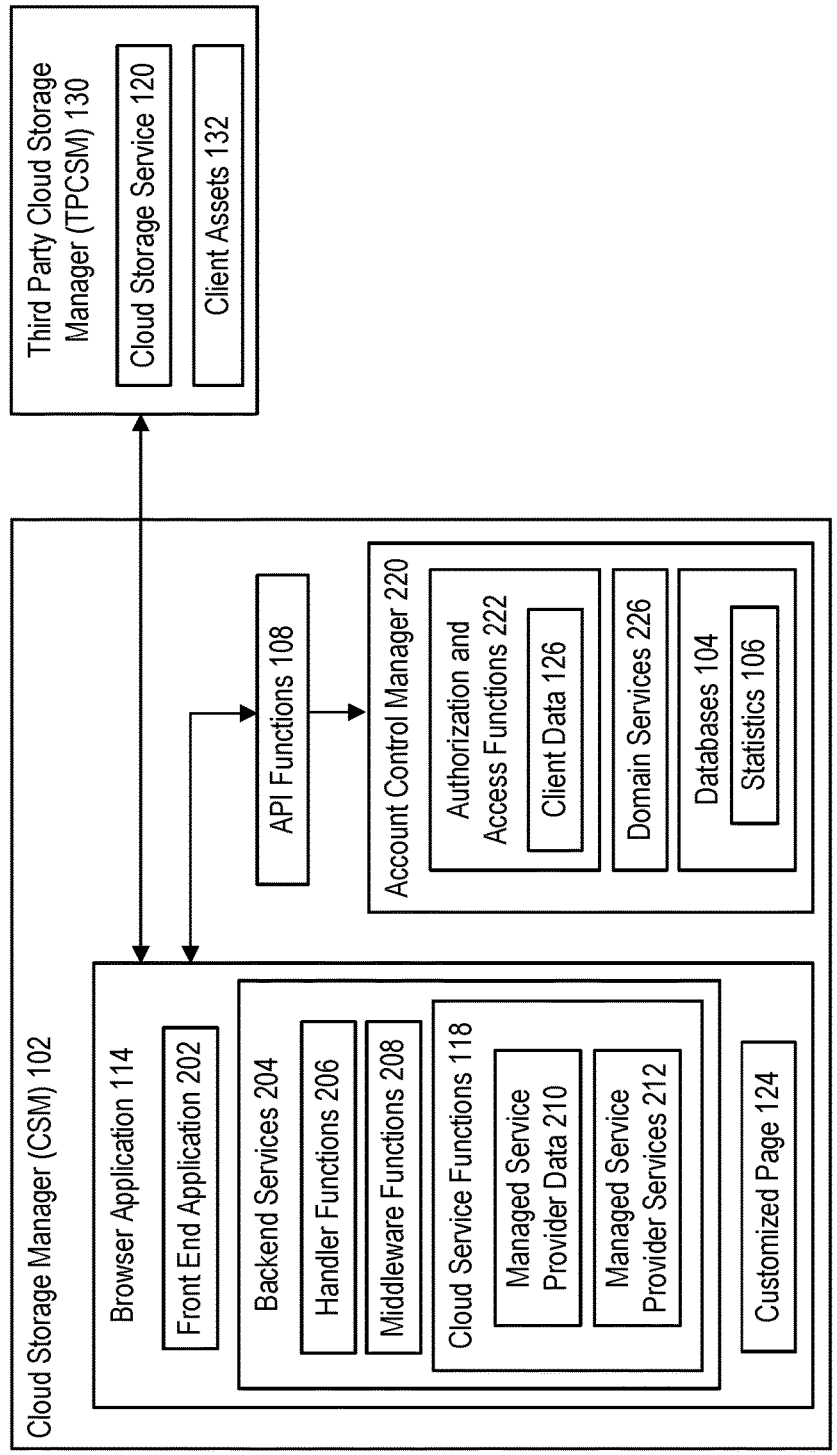
FIG. 2 is a block diagram illustrating another example of a system for generating a page customized using assets stored on a remote cloud storage platform and listing cloud storage statistics.

FIG. 2 illustrates an example of a system 200 in which a browser application 114 of a CSM 102 acquires client assets 132 from a remote TPCSM 130 to generate a customized page 124. A CSM 102 can include a browser application 114 that communicates with TPCSM 130 and also communicates with an account control manager 220 via API functions 108. Browser application 114 can include a front end application 202, a backend services 204 and a customized page 124. Backend services 204 can include one or more handler functions 206, middleware functions 208 and cloud service functions 118 that can include managed service provider data 210 and managed service provider services 212. Account control manager 220 can include authorization and access functions 222 having client data 126, domain services 226 and databases 104 storing client's cloud storage statistics 106. TPCSM 130 can include cloud storage services 120 and client assets 132.

At a high level, system 200 can relate to an embodiment of a system 100 in which a browser application 114 of a CSM 102 communicates with a remote TPCSM 130 to acquire client assets 132 and communicates, via API functions 108, with account control manager 220 to acquire client's cloud storage statistics 106 to generate a customized page 122. In some embodiments, in response to a client request (e.g., request 144) to access or view client's cloud storage data (e.g., statistics 106), the browser application 114 can utilize client assets 132 stored on a remote TPCSM 130 and cloud storage statistics 106 stored in a database 104 of the CSM 102 to generate a customized page 124 listing the statistics 106 to the client using page theme and settings (e.g., look and feel created by the client's logo, colors and page arrangement) as defined by the client assets 132.

Front end application 202 can include any functions, programs, instructions or applications for acquiring any information relating to graphical or visual aspect of a customized page 124 from a TPCSM 130. Front end application 202 can include functions for acquiring client assets 132 to define or create a particular look and feel of the customized page 124, including for example particular colors, page arrangement, graphical or image details or any other page theme and settings related features of the customized page 124. Front end application 202 can include service functions for accessing custom assets 132 pertaining to settings or information on services or functionality of the page, such as for example settings for tables or links to statistics 106 requested by the client 140. Front end application 202 can include a function for acquiring components of data, such as a function for multi-part upload or download of the data (e.g., client assets 132).

Backend services 204 can include any functions, programs, instructions or applications for creating the customized page 124. Backend services 204 can include functions, applications or instructions for constructing the customized page 124 using the custom assets 132 and statistics 106. Backend services 204 can include authentication and authorization functions for accessing custom assets 132 and statistics 106. Backend services 204 can include functions for accessing or using access keys for gaining access, authentication or authorization. Backend services 204 can include information or data on users. Backend services 204 can include hypertext transport protocol (HTTP) based API functions.

Backend services 204 can include handler function 206 for managing objects or buckets. A bucket can include a group or collection of objects stored in cloud storage (e.g., database 104) of a CSM 102 and sharing the same immutability and retention settings. For example, an object or a bucket can be immutable as its state may not be changed after it is constructed. For example, retention of an object or a bucket (e.g., multiple objects) can include a rule to retain or store the object or the bucket (e.g., plurality of objects) for a particular period of time. Backend services 204 can identify objects to form buckets and can create and manage the buckets. Backend service 204 can include a middleware function 208 that can include authentication, authorization and logging functions for creating buckets and acquiring objects. The middleware function 208 can facilitate communication between the handler functions 206 and cloud service functions 118. For example, middleware functions 208 can perform authentication, authorization or logging into particular data on behalf of cloud service functions 118.

Managed service provider data 210, also referred to as MSP data 210 can include any data corresponding to MSPs 110 for which CSM 102 performs cloud storage services. MSP data 210 can include access, authentication or authorization information for MSPs 110, including objects relating to cloud storage services 120 of the MSPs 110. MSP data 210 can include domain identifiers 122 of the MSPs 110 or data for network interfacing with MSPs 110, such as IP addresses, MAC addresses or any other information for communicating with MSPs 110 or their functions across the network 150. MSP data 210 can include access keys for gaining access to particular data objects (e.g., statistics 106 or client assets 132).

Managed service provider services 212, also referred to as MSP services 212, can include any functions, applications or instructions for providing services for the MSPs 110. MSP services 212 can include rules, policies or instructions for storage of data corresponding to any application or service of a MSP 110. For example, MSP services 212 can include storage instructions, rules or policies for a SaaS application, a PaaS service, or any other function or application of MSP 212. MSP services 212 can include functions or applications for servicing objects of data in storage locations. MSP services 212 can include functions for generating buckets out of one or more objects in the storage space (e.g., database 104). MSP services 212 can include authentication and authorization functions for gaining access to databases or storage locations (e.g., database 104 of the CSM 102 or a database of TPCSM 130 storing client's custom assets 132). MSP services 212 can utilize access keys from client data 126 to gain access to particular data or information.

Account control manager 220, also referred to as the ACM 220, can communicate with the browser application 114 via API functions 108. ACM 220 can include any functions, applications or instructions for managing multiple cloud storage accounts. ACM 220 can include functionality for MSPs 110 to set up their accounts, such as via a graphical user interface, and configure their cloud storage services. ACM 220 can include authorization and access functions 222 for controlling access to client data 126. ACM 220 can include domain services 226 for managing access or providing services relating to domain related data, such as domain identifiers 122.

Authorization and access functions 222, also referred to as AAF 222, can include applications, functions and instructions for implementing authorization, authentication and access to various data. AAF 222 can include authentication functions for authenticating client requests 144. AAF 222 can include authorization function for determining if the user on the client 140 has authorization to access statistics 106 requested by the client 140 or MSP 110.

ACM 220 can utilize domain services 226 to help identify, access or provide statistics 106 requested by the client 140. Domain services 226 can include a domain name system (DNS) application for identifying MSPs 110 based on their domain identifier 122 or based on the domain name from the client request 144. Domain services 226 can include or utilize a DNS API to provide the DNS response to the browser application 114 or ACM 220. Domain services 226 can include containers for providing operation for various processes, such as a process to generate the customized page 124 in response to the request, including for example using Kubernetes as the platform.

FIG. 3 depicts an example 300 of a screenshot of a customized page 124 that can be generated by the Cloud Storage Manager 102 and provided to the client 140 in response to a client request 144. Customized page 124 can be created to conform to the theme and settings (e.g., the look and feel) in accordance with custom assets 132, such as the company name 302 and company logo 304. The custom assets 132, such as the company or enterprise name 302 and logo 304 can be examples of objects 502, which can be a part of a bucket 306. Customized page 124 can further include other custom assets 132, such as page arrangement, one or more buttons or icons, search windows or functions and listing of data that can be arranged in accordance with a table or a list, which can also be one of the custom assets 132.

The customized page 124 of the example 300 can list various cloud storage statistics 106, such as buckets 306 names or data, geographical region data 308 or creation time data 310. For example, customized page 124 can list information or data for buckets 306 (e.g., clusters of objects stored in the cloud storage) which can include titles that can be based on dates of the buckets 306. For example, customized page 124 can list a geographical region 308 for each of the buckets 306. For example, customized page 124 can list a creation time 310 for each of the buckets. For example, customized page can list a bucket 306 titled 08-december-2022, which can correspond to region 308 of us-east-1 (e.g., one of the server locations on the East side of the United States) and a creation time 310 of 8 Dec. 2022 02:38 PM (e.g., time when the bucket 306 was created). Customized page 124 can list any number of buckets 306 corresponding to their regions 308, creation times 310 or any other statistics 106.

FIG. 4 depicts an example 400 of a screenshot of a customized page 124 that can be generated and provided to the client 140 in response to a client request 144. Customized page 124 can include a create bucket window 402 that can be generated by the browser 114 in response to a user clicking on the create bucket 404 button. Create bucket window 402 can include options for the user to enter a bucket name and select a region for the bucket 306. The bucket window 402 can be used for bucket versioning, bucket logging or bucket locking. When bucket versioning is enabled, the user can retrieve and restore any previous version of an object in the bucket 306. When bucket logging is enabled, a text log file of all access to a bucket can be created. When object locking is enabled, it can allow the user to prevent objects from being overwritten or deleted for a fixed amount of time. Just like the create bucket window 402, example 400 can also include windows for editing or modifying buckets 306 or any statistics 106 related to buckets 306.

Figure 5:
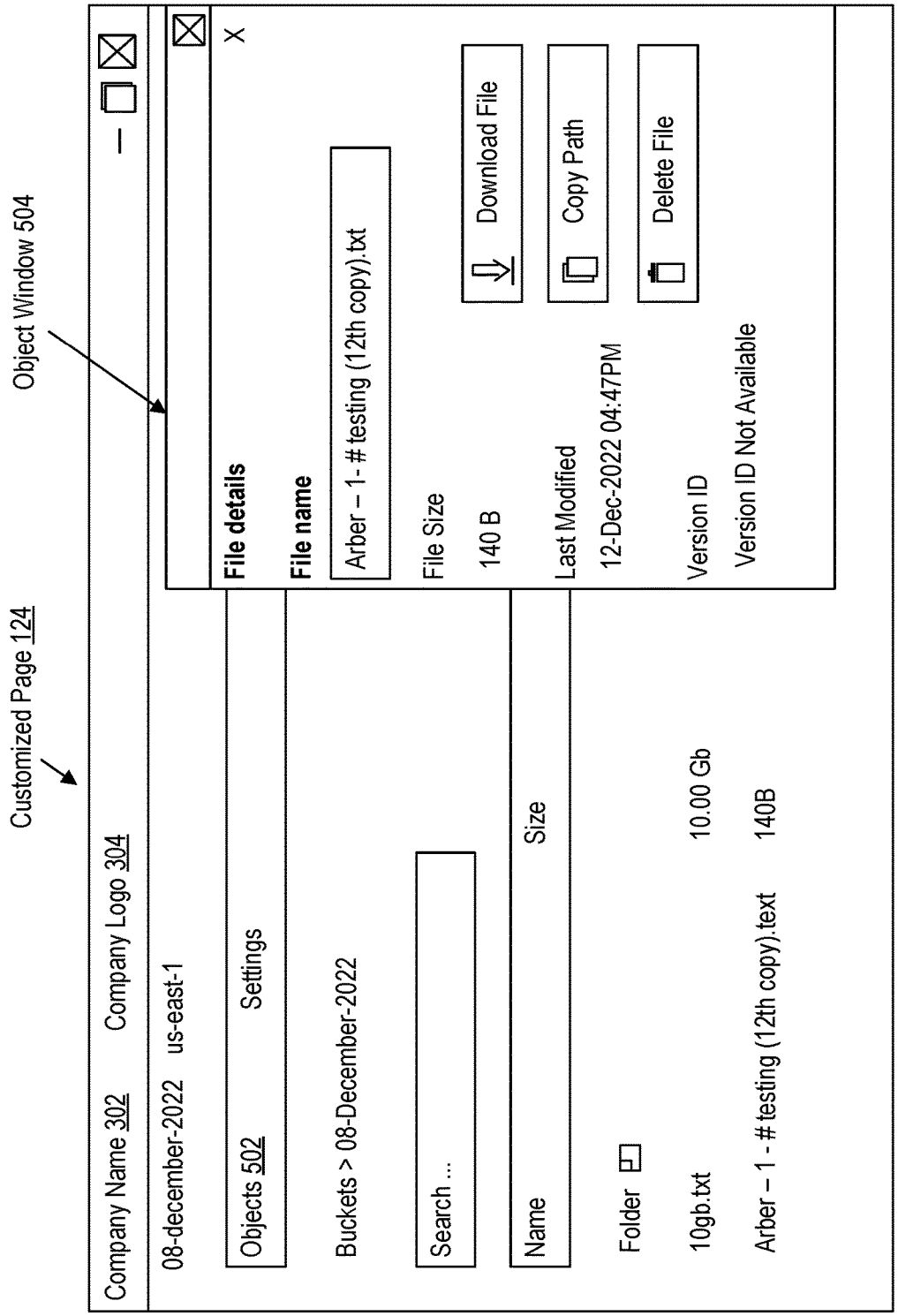
FIG. 5 depicts an example of another customized page generated using systems and methods described herein.

FIG. 5 depicts an example 500 of a screenshot of a customized page 124 that can be generated and provided to the client 140 in response to a client request 144. Customized page 124 can include information on objects 502. Customized page 124 can also include an object window 504 to allow for view or editing of information or data (e.g., statistics 106) on objects 502. Object window 504 can include statistics 106, such as information on file name of the object 502, file size of the object 502, or date of last modification of object 502. Object window 504 can also include functions for downloading of object 502 file, copying path to object 502 or deleting object 502 file. Customized page 124 can list objects along with statistics 106 on objects, such as object 502 names (e.g., file names), sizes of objects 502 in terms of memory size and date of creation of objects 502. Customized page 124 can further include the arrangement of buttons, search windows or functions and listing of data.

In some aspects, the present solution relates to a system (e.g., system 100 or 200) for customized display of cloud storage statistics 106. In some aspects, the present solution relates to a system for providing, via a customized page 124, cloud storage statistics 106 in a theme or a format defined or created based on, or using, custom assets 132 (e.g., colors, graphics, arrangements or other features of a web page whose theme and settings the client 140 expects to receive). The present solution can relate to a system 100 or 200 for providing a customized cloud storage report 160 in response to a request 144 for a report 160. The system 100 or 200 can include one or more processors (e.g., processors 810) that can be configured (e.g., programmed using instructions or code stored in memory 815, ROM 820 or storage device 825).

The one or more processors 810 can be configured to receive a request 144 from a client 140 pertaining to use of cloud storage at a Cloud Storage Manager (CSM) 102. In some embodiments, the request 144 can be from a managed service provider 110. The cloud storage can be provided for, or on behalf of, the client 140 or the managed service provider 110. The client 140 can be a client that utilizes services or products of the managed service provider 110. The request 144 can include a domain identifier associated with the managed service provider 140.

The one or more processors 810 can be configured to receive, by a CSM 102, a request 144 pertaining to (e.g., requesting) a report 160 on use of cloud storage (e.g., databases 104) of the CSM 102 by a client 140 of a MSP 110 providing the cloud storage to the client 140. The request 144 can include a domain identifier 122 associated with the MSP 110. For example, the request can include a URL, or a domain name of a URL, corresponding to the MSP 110.

The one or more processors 810 can be configured to transmit a request for a custom asset 132 associated with the domain identifier 122 to a first cloud storage service. The first cloud storage device can be a third party cloud storage manager 130 storing client assets 132 that can define, identify, describe or otherwise provide theme or settings for web pages of a particular design customized for the client 140 or MSP 110. The one or more processors 810 (of the CSM 102) can transmit a request for a custom client asset 132 associated with the domain identifier 122 to a second CSM (e.g., TPCSM 130) providing a second cloud storage (e.g., 120) storing the custom asset 132.

The one or more processors 810 can be configured to receive, from the first cloud storage service, the requested custom asset 132 associated with the domain identifier 122. The requested custom asset can include, describe, define, provide or otherwise identify any one or more of a web page color, style, images or graphics, media files, menus or buttons, logos or icons, customized phrasing or fonts, arrangements or locations of particular web page functions or features or any other details for recreating a format or theme of a customized web page. For example, the one or more processors 810 can receive, from the second CSM (e.g., TCSM 130), the requested custom asset 132 associated with the domain identifier 122.

The one or more processors 810 can be configured to request, from a database 104 via an application programming interface (API) call, statistics 106 regarding use of a second cloud storage service by the client. The second cloud storage service can include a CSM 102 or an MSP 110. The second cloud storage service can include an MSP 110 providing a portion of the cloud storage of the CSM 102 to the clients 140. The one or more processors can make the request via an API function 108. The request can be for all statistics 106 of a client 140, a portion of statistics 106 of the client 140. For example, the request can be for statistics 106 for one or a subset of buckets 306 of a plurality of buckets 306 of the client 140. For example, the request can be for one or a subset of objects 502 of a plurality of objects 502. The one or more processors 810 can request, from a database 104 of the cloud storage via an application programming interface (API) call (e.g., from an API function 108), storage information 162 on usage of the cloud storage by the client 140.

The one or more processors 810 can be configured to receive, from the second cloud storage service, statistics 106 regarding use of a second cloud storage service by the client 140. The one or more processors 810 can be configured to render, using the retrieved custom asset 132 and statistics 106, a customized page 124 displaying the cloud storage statistics 106. The one or more processors 810 can be configured to receive, from the database 104 responsive to the API call, the storage information 162 corresponding to a first storage amount of client information (e.g., 162) stored on the cloud storage and a second storage amount of client information (e.g., 162) deleted from the cloud storage within a retention period. The retention period can be set or established by a retention function 164 and can correspond to any time period, such as up to 30 days, 60 days, 90 days or 120 days).

The one or more processors 810 can be configured to render, for a browser application 114 of the managing service provider (e.g., CSM 102), the customized page 124 by inserting into the customized page 124 a link (e.g., a hyperlink) to a page (e.g., a second customized page 124) of a subset of statistics 106 corresponding to a geographic region 308 in which services corresponding to the subset of the statistics 106 were provided. The geographic region 308 can correspond to a region of the servers providing the CSM 102 in which the objects 502 or buckets 306 were created or modified. The page of a subset of statistics 106 can include one or more objects 502 or buckets 306 that can correspond to a particular geographic region 308, a particular client 140, a particular user of the client 140, a particular MSP 110, a particular cloud storage application 142, a particular domain identifier 122 (e.g., a particular second level identifier), or particular time or time period during which the subset of buckets 306 or objects 502 were created or modified.

The one or more processors 810 of the CSM 102 can be configured to send to the client 140, the report 160 customized to include the storage information 162 data and the retrieved custom assets 132 of the MSP 110. The one or more processors can send to the client 140 the report 160 in response to the request 144 of the client 140 or the MSP 110 requesting the report 160, In some embodiments, the one or more processors 810 can retrieve the custom asset 132 using the domain identifier 122 that can include a second level identifier corresponding to the managed service provider 110. The second level identifier can correspond to a particular application, service, webpage or a website of the MSP 110. The second level identifier can correspond to CSM 102. The second level identifier can correspond to the client 140.

The one or more processors 810 of the CSM 102 can receive, from the client 140, the request 144 directed to the MSP 110 and pertaining to the report 160 corresponding to a time period. The one or more processors 810 of the CSM 102 can send, responsive to the request from the client 140 and on behalf of the MSP 110, the report 160 to the client 140. The report can correspond to the time period and indicate an amount of the storage information 162 data including the first storage amount (e.g., 162) and the second storage amount (e.g., 162).

The one or more processors 810 of the CSM 102 can receive, by the cloud storage manager from the MSP 110, the request 144 pertaining to the report 160 corresponding to a time period. The one or more processors 810 of the CSM 102 can send, on behalf of the MSP 110, the report 160 to the client 140. The report 160 can correspond to the time period and indicate an amount of the storage information 162 data including the first storage amount (e.g., 162) and the second storage amount (e.g., 162).

The one or more processors 810 of the CSM 102 can identify a MSP rate 166 for resource 156 utilization corresponding to a plurality of clients 14—of the MSP 110. The plurality of clients 140 can include the client 140. The one or more processors 810 of the CSM 102 can determine an amount of resource 156 utilized by the client 140 according to the MSP rate 166 for resource 156 utilization and an amount of storage information 162 data, including the first storage amount (e.g., 162) and the second storage amount (e.g., 162). The one or more processors 810 of the CSM 102 can send to the client 140 the report 160 including the amount of resource 156 utilized by the client 140.

The one or more processors 810 of the CSM 102 receive, from the database 104 responsive to the API call, the storage information 162 data corresponding to a third storage amount of client information deleted from the cloud storage (e.g., database 104) outside of the retention period. The one or more processors 810 can send, by the CSM 102 to the client 140, the report 160 that is customized to include the third storage amount (e.g., storage information 162 deleted from the database 104 passed the retention period).

The one or more processors 810 of the CSM 102 can identify an MSP rate 166 for resource 156 utilization corresponding to the MSP 110. The one or more processors 810 can receive, from the database 104 responsive to the API call, the storage information 162 data corresponding to a third storage amount of client information (e.g., client data 126) deleted from the cloud storage outside of (e.g., passed) the retention period. The one or more processors 810 can determine an amount of resource 156 utilized by the client 140 according to the MSP rate 166 for resource 156 utilization and an amount of storage information 162 data including the first storage amount and the second storage amount. The one or more processors 810 of the CSM 102 can send the report 160 including the amount of resource 156 utilized by the client 140 and the third storage amount (e.g., storage information 162 deleted from the database 104 passed the retention period).

The one or more processors 810 can be configured to transmit, by a browser application 114 of the managing service provider (e.g., CSM 102), the request 144 to the first cloud storage (e.g., TPCSM 130) via an API call that can correspond to the custom asset 132. The one or more processors 810 can be configured to receive, by the browser application 114 from the first cloud storage service (e.g., TPCSM 130), the custom asset 132 responsive to the API call corresponding to the custom asset 132.

The one or more processors 810 can be configured to receive, by a browser application 114 of the managing service provider (e.g., CSM 102), the request 144 from the client 140 using the first cloud storage service that is provided to the client 140 by the managed service provider (e.g., MSP 110). The first cloud storage service can be maintained by the managing service provider 102. The one or more processors 810 can be configured to render, by the browser application 114, the customized page 124 for the client 140 on behalf of the managed service provider 110. For example, the first cloud storage service can store custom assets 132 on a database 104 of the CSM 102. For example, the first cloud storage service can be controlled, managed, deployed and operated by the CSM 102 that can store custom assets 132 of the client 140 on the cloud storage (e.g., database 104) of the CSM 102. For example, the one or more processors 810 of the CSM 102 can transmit the request to the TPCSM 130 via an API call corresponding to the custom asset 132 and receive (e.g., by the CSM 102) from the TPCSM 130, the custom asset 132 responsive to the API call corresponding to the custom asset 132.

The one or more processors 810 can be configured to receive, by a browser application 114 of the managing service provider (e.g., 102), the request 144 to retrieve the statistics 106 of the client 140 corresponding to a service provided to the client 140 by the managed service provider 110. The service provided by the MSP 110 can include one or more of a SaaS application, a PaaS service, a DaaS service, a MSaaS application or service, a MBaaS application or service, a DCaaS, an iPaaS or ITMaaS. The one or more processors 810 can be configured to send, by the browser application 114 to the first cloud storage service managed by the managing service provider (e.g., CSM 102), the API call corresponding to the statistics 106 for the service. The one or more processors 810 can be configured to receive, by the browser application 114 from the first cloud storage service, the statistics 106 for the service responsive to the API call.

The one or more processors 810 can be configured to receive a second request from the managed service provider 110 corresponding to the use of cloud storage by a plurality of clients 140 of the managed service provider 110. For example, the request can be by the MSP 110 to list the statistics 106 for a plurality of clients 140 of the MSP 110 whose data is stored on the cloud storage monitored, controlled or provided by the managing service provider (e.g., CSM 102). The one or more processors 810 can be configured to render, using statistics 106 of the plurality of clients 140, the customized page 124 displaying cloud storage statistics 106 of the plurality of clients 140. For example, the customized page 124 can list all statistics 106 of all client data 126 of all clients 140 of the MSP 110 serviced by the MSP 110 using cloud storage of the CSM 102.

The one or more processors 810 can be configured to transmit, by a browser application 114 of the managing service provider (e.g., CSM 102), a second API call corresponding to an access key for the custom asset 132. The access key can include any string of characters, including a password, a pass code, a secret key or a unique code for providing access to the custom assets 132. The one or more processors 810 can be configured to receive, by the browser application 114, the custom asset 132 using the access key. For example, the CSM 102 can access and acquire the custom asset 132 at a TPCSM 130 using the access key and use the acquired custom asset 132 to create, generate or otherwise provide the customized page 124.

In some aspects, the present solution relates to a non-transitory computer-readable medium comprising instructions that, when executed by one or more processors (e.g., 910), cause the one or more processors 810 to receive, by a browser application 114 of a managing service provider (e.g., CSM 102), a request 144 from a client 140 pertaining to use of cloud storage by the client 140 of a managed service provider 110. The request can include a domain identifier 122 that can be associated with the managed service provider 110. In some embodiments, a non-transitory computer-readable medium can include instructions that, when executed by one or more processors 810, cause the one or more processors 810 to receive a request 144 pertaining to a report 160 on use of cloud storage of the CSM 102 by a client 140 of a MSP 110 providing the cloud storage to the client 140. The request can include a domain identifier 122 associated with the MSP 110.

The instructions can cause the one or more processors 810 to transmit, by the browser application 114, a request 144 for a custom asset 132 associated with the domain identifier 122 to a first cloud storage service. The first cloud storage service can be on a TPCSM 130, CSM 102 or MSP 110. The instructions can cause the one or more processors 810 to receive, by the browser application 114 from the first cloud storage service. The requested custom asset 132 can be associated with the domain identifier 122.

The instructions can cause the one or more processors 810 to request, by the browser application 114 from a database 104 via an application programming interface (API) call, statistics 106 regarding use of a second cloud storage service by the client 140. The second cloud storage service can be a cloud storage service on a CSM 102, MSP 110 or TPCSM 130. Statistics 106 can be statistics on any objects 502 or buckets 306 stored in a database 104. Objects 502 or buckets 306 (e.g., a plurality of objects 502 sharing same settings or configurations) can include statistics 106 having metadata describing the objects 502 or buckets 306.

The instructions can cause the one or more processors 810 to receive, by the browser application 114 from the second cloud storage service, statistics 106 regarding use of the second cloud storage service by the client 140. The second cloud storage service can be deployed on or provided by TPCSM 130, MSP 110 or CSM 102. The instructions can cause the one or more processors 810 to render, by the browser application 114 using the retrieved custom asset 132 and statistics 106, a customized page 124 displaying the cloud storage statistics 106. The customized page 124 can be linked to other customized pages 124 listing statistics 106 on objects 502 or buckets 306.

For example, the instructions can cause the one or more processors 810 to transmit a request for a custom asset 132 associated with the domain identifier 122 to a second cloud storage manager (e.g., TPCSM 130) providing a second cloud storage (e.g., 120) storing the custom asset 132. The instructions can cause the one or more processors 810 to receive, from the second cloud storage manager (e.g., TPCSM 130), the requested custom asset 132 associated with the domain identifier 122.

The instructions can cause the one or more processors 810 to retrieve the custom asset using the domain identifier 122 that includes a second level identifier corresponding to the managed service provider 110. The second level identifier can identify a company name and can correspond to a website or a service by the MSP 110. The client 140 can be a client or a user of the website or service by the MSP 110 utilizing cloud storage provided by the CSM 102.

The instructions can cause the one or more processors 810 to transmit, by a browser application 114 of the managing service provider (e.g., CSM 102), the request 144 to the first cloud storage via an API call corresponding to the custom asset 132. The instructions can cause the one or more processors 810 to receive, by the browser application 114 from the first cloud storage service, the custom asset 132 responsive to the API call corresponding to the custom asset 132.

The instructions can cause the one or more processors 810 to request, from a database 104 of the cloud storage via an application programming interface (API) call, storage information 162 data on usage of the cloud storage by the client 140. The instructions can cause the one or more processors 810 to receive, from the database 104 responsive to the API call, the storage information 162 data corresponding to a first storage amount of client information (e.g., 162) stored on the cloud storage and a second storage amount of client information (e.g., 162) deleted from the cloud storage within a retention period.

The instructions can cause the one or more processors 810 to receive, by the browser application 114, the request 144 from the client 140 using the first cloud storage service provided to the client 140 by the managed service provider 110. The first cloud storage service can be maintained by the managing service provider (e.g., CSM 102). The instructions can cause the one or more processors 810 to render, by the browser application, the customized page 124 for the client 140 on behalf of the managed service provider 110.

The instructions can cause the one or more processors 810 to send, to the client 140, in response to the request 144 pertaining to the report 160, the report 160 customized to include the storage information 162 data and the retrieved custom assets 132 of the managed service provider 110.

The instructions can cause the one or more processors 810 to receive, from the client 140, the request 144 directed to the MSP 110 and pertaining to the report 160 corresponding to a time period (e.g., a month or a year). The instructions can cause the one or more processors 810 to send, responsive to the request 144 from the client 140 and on behalf of the MSP 110, the report 160 to the client 140. The report 160 can correspond to the time period (e.g., a month or a year) and can indicate an amount of the storage information 162 data including the first storage amount and the second storage amount.

The instructions can cause the one or more processors 810 to receive, from the MSP 110, the request 144 pertaining to the report 160 corresponding to a time period. The instructions can cause the one or more processors 810 to send, on behalf of the MSP 110, the report 160 to the client 140. The report 160 can correspond to the time period and can indicate an amount of the storage information 162 data including the first storage amount and the second storage amount.

The instructions can cause the one or more processors 810 to identify an MSP rate 166 for resource 156 utilization corresponding to a plurality of clients 140 of the MSP 110. The plurality of clients 140 can include the client 140. The instructions can cause the one or more processors 810 to determine an amount of resource 156 utilized by the client 140 according to the MSP rate 166 for resource 156 utilization and an amount of storage information 162 data including the first storage amount and the second storage amount. The instructions can cause the one or more processors 810 to send the report 160 including the amount of resource 156 utilized by the client 140.

The instructions can cause the one or more processors 810 to receive, from the database 104 responsive to the API call, the storage information 162 data corresponding to a third storage amount of client information (e.g., 162) deleted from the cloud storage outside of the retention period (e.g., past the retention time window). The instructions can cause the one or more processors 810 to send, to the client 140, the report 160 customized to include the third storage amount.

The instructions can cause the one or more processors 810 to identify an MSP rate 166 for resource 156 utilization corresponding to the MSP 110. The instructions can cause the one or more processors 810 to receive, from the database 104 responsive to the API call, the storage information 162 data corresponding to a third storage amount of client information deleted from the cloud storage outside of the retention period. The instructions can cause the one or more processors 810 to determine an amount of resource 156 utilized by the client 140 according to the MSP rate 166 for resource 156 utilization and an amount of storage information 162 data including the first storage amount and the second storage amount. The instructions can cause the one or more processors 810 to send the report 160 including the amount of resource 156 utilized by the client 140 and the third storage amount.

Figure 6:
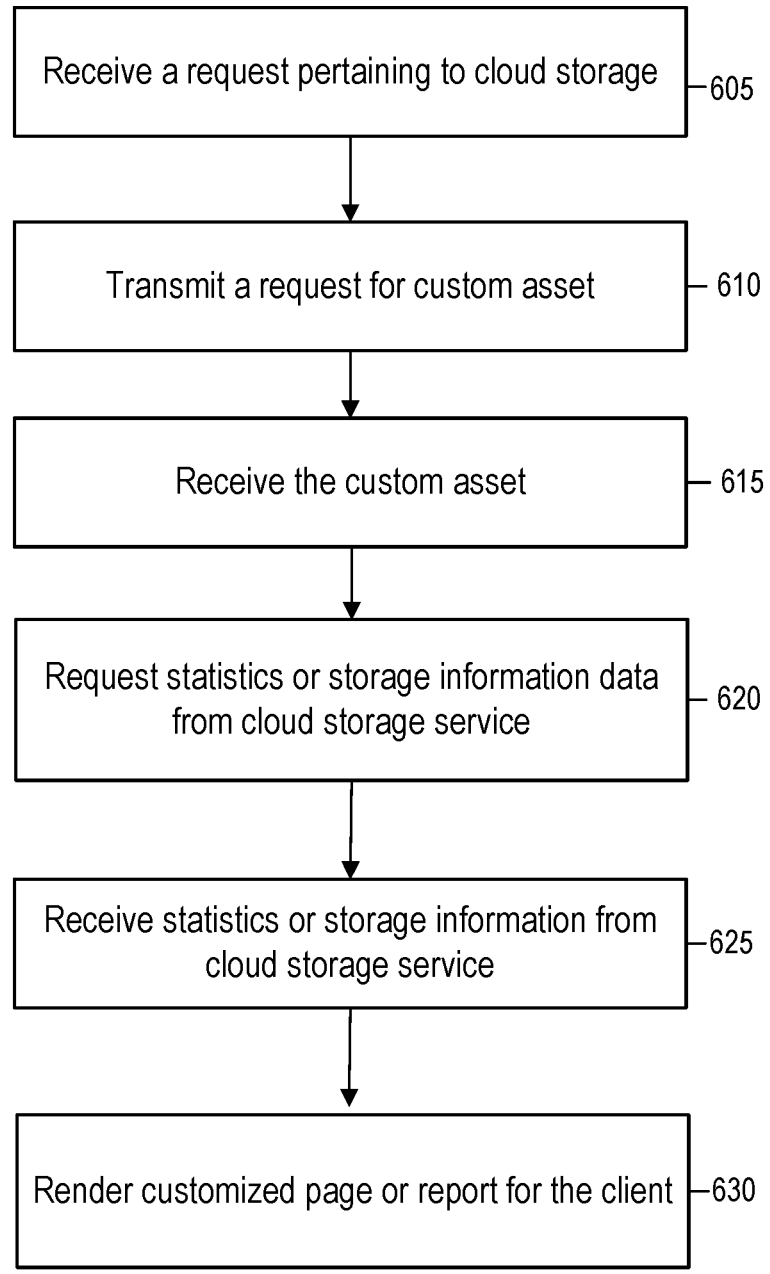
FIG. 6 is a flow diagram of an example method of generating a page customized using assets stored on a remote cloud storage platform and listing cloud storage statistics.

FIG. 6 illustrates an example flowchart of a method 600 of customized display of cloud storage statistics or providing a customized cloud storage report for the client. In some aspects, the present solution relates to a method of providing, via a customized page, cloud storage statistics in a theme or a format defined or created based on, or using, custom assets (e.g., colors, graphics, arrangements or other features of a web page whose theme and settings the client expects to receive). In some aspects, the present solution relates to a method of providing, to a client, a cloud storage report identifying client usage in response to a request for the report. The method 600 can be performed, for example, by one or more component of system 100 or 200 as depicted in FIGS. 1 and 2. The method 600 can include a cloud storage service provider receiving a request pertaining to cloud storage (605). The method 600 can include the cloud storage service provider transmitting a request for custom asset (610). The method 600 can include the cloud storage service provider receiving the custom asset (615). The method 600 can include the cloud storage service provider requesting statistics or storage information data from on cloud storage service (620). The cloud storage service provider can receive the statistics or the storage information data stored on the cloud storage service (625). The cloud storage service provider can render a customized page or provide a report for the client (630).

At 605, the method 600 can include a cloud storage service provider receiving a request pertaining to cloud storage. The method can include the one or more processors (e.g., of the CSM) receiving a request from a client pertaining to use of cloud storage from or by the client of a managed service provider. The request can be by or from a managed service provider. The request can include a domain identifier associated with the managed service provider. The domain identifier can include a domain name. The request can include a domain identifier associated with the client (e.g., a client enterprise or a business). The request can pertain to client data including one or more objects or buckets (e.g., a plurality of objects having their storage controlled) stored in the cloud storage.

A browser application of the managing service provider can receive the request from the client using the first cloud storage service provided to the client by the managed service provider. The first cloud storage service can be maintained by the managing service provider. The managing service provider can provide the first cloud storage service for storing data of the client on the cloud on behalf of the managed service providers. The first cloud storage service can allow managed service providers to manage storage of data of the client.

The browser application of the managing service provider can receive the request to retrieve the statistics of the client corresponding to a service provided to the client by the managed service provider. For example, the managed service provider can provide, gather, generate and store statistics corresponding to client data stored on the first cloud storage service on behalf of the managed service provider. The managed service provider can provide the client with a cloud-based service (e.g., SaaS, PaaS, or cloud storage) and can utilize the first cloud storage of the managing service provider to provide the cloud-based service.

The one or more processors can receive a second request from the managed service provider corresponding to the use of cloud storage by a plurality of clients of the managed service provider. The second request can be a request from the managed service provider to access statistics corresponding to a plurality of clients whose data the managed service provider stored on the cloud storage of the managing service provider.

The one or more processors of a CSM can receive a request pertaining to a report on use of cloud storage of the CSM by a client of a MSP. The MSP can provide the cloud storage to the client. The request can include a domain identifier associated with the MSP. The request can include a URL or a domain name corresponding to the MSP.

The one or more processors can receive, from the client, the request directed to the MSP and pertaining to the report corresponding to a time period. The one or more processors can receive, from the MSP, the request pertaining to the report corresponding to a time period. The time period can be a week, a month, a plurality of months, or a year.

At 610, the method 600 can include the cloud storage service provider transmitting a request for custom asset. The one or more processors can transmit a request for a custom asset associated with the domain identifier to a first cloud storage service. The request can be transmitted to the third party cloud storage manager storing the custom asset. The custom asset can include any data, information or instructions for creating a theme or settings for the customized web page for the client. The custom asset can include any features for creating a customized page of the client (e.g., client enterprise) or managed service provider. The custom asset can include, for example, a color (e.g., background color, foreground color, theme colors) of the customized page, a logo for the customized page, images or media for the customized page, arrangement or settings for the customized page, theme for the customized page or any other information or instructions for creating a customized page for the client or managed service provider.

A browser application of the managing service provider can transmit the request to the first cloud storage via an API call corresponding to the custom asset. For example, the browser application can transmit the request for the custom asset via an API function. The request can identify the client or the managed service provider for whose web page to acquire the custom assets. A browser application of the managing service provider can transmit a second API call corresponding to an access key for the custom asset. For example, the managing service provider can acquire or receive the access key from an authorization and access function and can transmit the second request including the access key.

The one or more processors can transmit a request for a custom asset associated with the domain identifier to a second cloud storage manager providing a second cloud storage storing the custom asset. The one or more processors can transmit the request to the second cloud storage via an API call corresponding to the custom asset. For example, the API call can identify one or more features of the MSP to be included on the report (e.g., logo, graphics, colors or any other assets that can be included in the report).

At 615, the method 600 can include the cloud storage service provider receiving the custom asset. The one or more processors can receive from the first cloud storage service the requested custom asset associated with the domain identifier. The first cloud storage service can include the managing service provider or the third party cloud storage manager. For example, the managing service provider can receive the requested custom asset from the third party cloud storage manager. The received custom asset can include a custom asset associated with the domain identifier of the client or the managed service provider.

The one or more processors can retrieve the custom asset using the domain identifier including a second level identifier corresponding to the managed service provider. For example, the received custom asset can be identified based on a second level identifier. The second level identifier can correspond to a client or the managed service provider. The second level identifier can identify one or more objects corresponding to custom assets and can receive the one or more objects corresponding to custom assets from the first cloud storage service.

The browser application can receive, from the first cloud storage service, the custom asset responsive to the API call corresponding to the custom asset. For example, the custom asset can be received responsive to an API call via an API function interfacing with the browser application. The browser application can receive the custom asset using the access key. For example, the received custom asset can correspond to the access key sent by the browser application to the first cloud storage service in the request for the custom asset.

The one or more processors can receive, from the second cloud storage manager, the requested custom asset associated with the domain identifier. The one or more processors can receive, from the second cloud storage, the custom asset responsive to the API call corresponding to the custom asset. For example, the one or more processors can receive any one or more features of the MSP to be included on the report (e.g., logo, graphics, colors or any other assets that can be included in the report).

At 620, the method 600 can include the cloud storage service provider requesting statistics on cloud storage service or storage information from the cloud storage service. The one or more processors can request, from a database via an application programming interface (API) call, statistics regarding use of a second cloud storage service by the client. The database can be a database of the managing service provider (e.g., CSM). Statistics can include any statistics, information, metadata or data on the client data stored in the cloud storage service of the cloud storage service provider (e.g., the CSM).

The browser application can send, to the first cloud storage service managed by the managing service provider, the API call corresponding to the statistics for the service. The statistics can include file types, file names, file sizes, dates of storage of files, dates of update of files, retention information, regional information on data stored, information on access to data, or any other data pertaining to storage of the data stored. The one or more processors can request, from a database of the cloud storage of the CSM, via an application programming interface (API) call, storage information data on usage of the cloud storage by the client. Storage information data can include, for example, information or data on the size or amount of storage utilized, occupied or taken up by the client data stored on the database (e.g., cloud storage) of the CSM.

At 625, the cloud storage service provider can receive statistics on cloud storage service or storage information from the cloud storage service. The one or more processors can receive, from the second cloud storage service, statistics regarding use of the second cloud storage service by the client. The second cloud storage service can be a cloud storage service by a managing service provider (e.g., CSM). The browser application can receive, from the first cloud storage service, the statistics for the service responsive to the API call.

The cloud storage service provider (e.g., of the CSM) can receive statistics in response to API calls for the statistics. The browser application of the managing service provider (e.g., CSM) can receive statistics for objects or buckets corresponding to the client. The browser application of the managing service provider can receive statistics for objects or buckets corresponding to the managed service provider.

The one or more processors can receive, from the database responsive to the API call, the data corresponding to a first storage amount of client information stored on the cloud storage and a second storage amount of client information deleted from the cloud storage within a retention period. For example, the first storage amount can correspond to the client data currently stored and not deleted. For example, the first storage amount can correspond to the client data deleted, but still occupying storage space of the CSM because the deletion has not exceeded the retention period. The client can still have an option to undelete the data corresponding to the second storage amount up until the retention period expiration. For example, the retention period can be 90 days and the second storage amount can correspond to the client information deleted less than 90 days ago.

The one or more processors can receive, from the database responsive to the API call, the data corresponding to a third storage amount of client information deleted from the cloud storage outside of the retention period. The third storage amount can correspond to the client information deleted at a point in time that is passed the retention period. For example, the retention period can be 90 days and the third storage amount can correspond to the client information deleted more than 90 days ago.

At 630, the cloud storage service provider can render a customized page or provide report for the client. The one or more processors can render a customized page displaying the cloud storage statistics using the retrieved custom asset and statistics, a customized page displaying the cloud storage statistics. For example, the one or more processors (e.g., of the CSM) can render the customized page including the statistics by customizing the page according to custom assets. For example, the page can be customized to have or include one or more colors, logos, images, media, arrangements, themes or settings according to the custom assets. The page can be a web page.

The one or more processors can render the customized page by inserting into the customized page a link to a page of a subset of statistics corresponding to a geographic region in which services corresponding to the subset of the statistics were provided. The browser application can render the customized page for the client on behalf of the managed service provider. The one or more processors can render the customized page using statistics of the plurality of clients, such as by including or listing the statistics or links to pages including the statistics. The customized page can display the cloud storage statistics of the plurality of clients. The customized page can display statistics for one or more objects or buckets. The customized page can include hyperlinks to other customized pages including one or more subsets or different sets of statistics pertaining to different sets of objects or buckets, based on the geographic locations, dates of storage or any other statistics of the included sets of objects or buckets.

The one or more processors can send to the client responsive to the request pertaining to the report, the report customized to include the data and the retrieved custom assets of the managed service provider. The one or more processors can send, on behalf of the managed service provider, the report to the client. The report can correspond to the time period and indicate an amount of the data including the first storage amount and the second storage amount.

The one or more processors can send, on behalf of the managed service provider, the report to the client. The report can correspond to the time period and indicate an amount of the storage information data including the first storage amount and the second storage amount. The one or more processors can identify a MSP rate for resource utilization corresponding to a plurality of clients of the MSP. The plurality of clients can include the client. The one or more processors can determine an amount of resource utilized by the client according to the rate for resource utilization and an amount of data including the first storage amount and the second storage amount. The one or more processors can send the report including the amount of resource utilized by the client. The one or more processors can send, to the client, the report customized to include the third storage amount. The one or more processors can identify a rate for resource utilization corresponding to the managed service provider. The one or more processors can receive, from the database responsive to the API call, the storage information data corresponding to a third storage amount of client information deleted from the cloud storage outside of the retention period. The one or more processors can determine an amount of resource utilized by the client according to the rate for resource utilization and an amount of data including the first storage amount and the second storage amount. The one or more processors can send the report including the amount of resource utilized by the client and the third storage amount.

Figure 7:
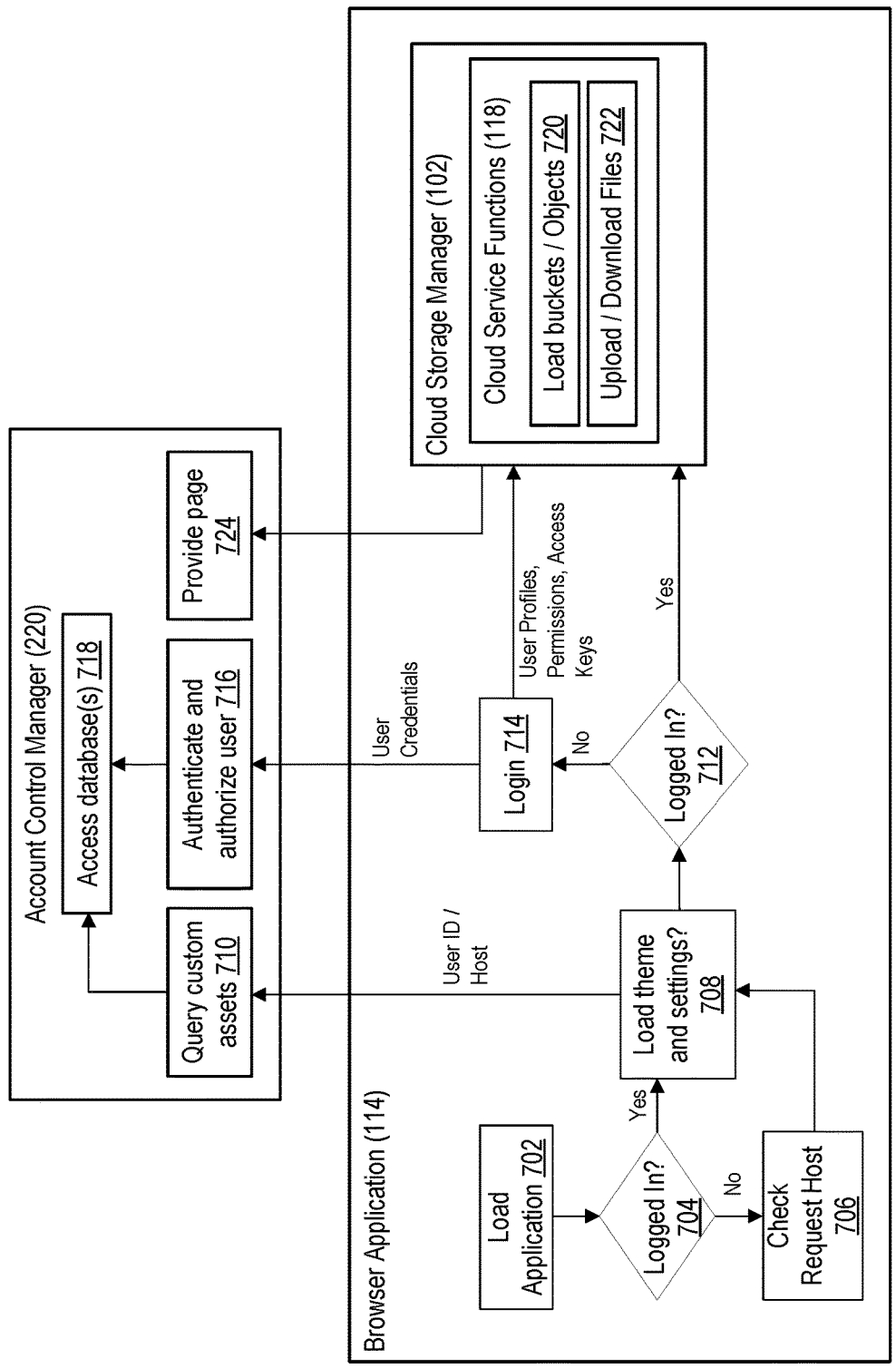
FIG. 7 is a flow diagram of another example method of generating a page customized using assets stored on a remote cloud storage platform and listing cloud storage statistics.

FIG. 7 depicts an example flowchart of a method 700 of customized display of cloud storage statistics. In some aspects, the present solution relates to a method of providing, via a customized page, cloud storage statistics in a theme or a format defined, provided or created based on, or using, custom assets (e.g., colors, graphics, arrangements or other features of a web page whose theme and settings the client expects to receive). The method 700 can be performed, for example, by one or more component of system 100 or 200 as depicted in FIGS. 1 and 2. Method 700 can begin by loading a browser application (702). The browser application can determine if the user from the client is logged in to the browser application (704). The browser application can check the request host (706). The browser application can check if the theme and settings are loaded (708). A query can made for custom assets to the account control manager (710). The browser application can check if the user of the client is logged in to access the data stored by the managed service provider (712). If the user is not logged in to access the data, a login can be performed (714). The user can be authenticated and authorized (716). The authorized and authenticated user can access the database to acquire the custom assets (718). Objects and buckets can be loaded (720). Files can be uploaded or downloaded (722). The customized page can be provided (724).

At 702, browser application is loaded. The browser application can be a browser application of the managing service provider, such as a CSM. The browser application can be an application for generating customized pages in response to client requests, such as the client requests to access statistics on client data on the cloud storage service provided by the managing service provider.

At 704, browser application determines if the user from the client is logged in to the browser application. The browser application can include an authentication or authorization application or a function in which the user from the client can enter the username and password of the user to access the browser application. The browser application can include the functionality for providing a customized webpage or a report for reporting storage information and/or resources utilized based on the rates of a given managed service provider.

At 706, the browser application checks the request host. If the user of the client is not logged in to the browser application, the browser application can check the request host to determine if the user or the client is authenticated and authorized to access, such as via a saved credential or previous authentication and authorization.

At 708, the browser application checks if the theme and settings are loaded. The browser application can determine if the theme and settings are loaded in response to a request (e.g., a prior request) from a client to access statistics pertaining or corresponding to the objects and/or buckets of client data stored on the cloud storage of the managing service provider providing the browser application. Upon logging in by the user or determining that the client or user is already previously authenticated and authorized to access, the browser application can determine if the load theme and settings are available. The load theme and settings can pertain to customized features or details of the customized page to be prepared for the client in response to a received client request (e.g., such as at 605 of method 600).

At 710, a query is made for custom assets to the account control manager. The query can include an API. The query can include a user identifier and/or a host information which can be sent to the account control manager to make or forward the query for custom assets. The custom assets can be stored on a third party cloud storage manager or on the managing service provider (e.g., CSM). The query for custom assets (e.g., API call) can be constructed to include or by using the user identifier information and/or host information.

At 712, the browser application checks if the user of the client is logged in to access the data stored by the managed service provider. For example, the browser application can determine if the user is authorized to access data stored in the cloud storage of the managing service provider (e.g., CSM). Browser application can utilize authorization function to determine if the user is logged in to access objects and/or buckets pertaining to the request received from the client (e.g., at 708 of method 700).

At 714, if the user is not logged in to access the data a login is performed. The login can include a prompt window for username and password of the user (e.g., client) to access the objects and/or buckets requested in the received request. The browser application can send the user credential to the account control manager to authenticate and authorize the user. The browser application can send an API call using or including the user credentials or user authorization information.

At 716, the user is authenticated and authorized. The user can be authenticated and/or authorized based on or in response to an API call including the authentication or authorization information for user storage data. The user can be authenticated using an authentication or authorization function and the user's credentials. For example, the user's credentials can grant the user access to the requested data. In response to the authorization and authentication, the user (e.g., the client) can access account control manager 220.

At 718, the authorized and authenticated user accesses the database to acquire the custom assets. For example, in response to the user (e.g., client) getting authorized to access the database of the CSM or the third party cloud storage manager, the user can acquire the data or information stored in the database. For example, upon authenticating or authorizing the user, account control manager can send an API call to access the custom assets for generating the customized webpage or the report for the managed service provider. In some embodiments, the data or information stored in the database can include custom assets requested at 710 of method 700. In some embodiments, the data or information stored in the database can include access keys for accessing the objects or buckets of data (e.g., cloud storage statistics). In some embodiments, the data or information stored can include the cloud storage statistics.

At 720, objects and buckets are loaded. The objects and buckets can correspond to the client data stored on the managing service provider's cloud storage service. The objects and buckets can correspond to the cloud storage statistics identified by the client request. The cloud storage manager can load any data pertaining to the received request at 605 of method 600, including storage information, client data, statistics, MSP rates or resources. The user can provide user profiles, permission and access keys to the managing service provider or cloud service functions to provide objects or buckets to the user. Cloud service functions can load buckets or objects as identified based on the user profiles, permissions or access keys.

At 722 files are uploaded or downloaded. Cloud service functions can upload or download files needed to respond to the request from the browser application for the objects or buckets of data. Uploads or downloads of files can be performed in response to user profiles, permissions and access keys being received.

At 724 the customized page is provided. Cloud service function and/or the browser application of the managing service provider can generate the customized application using the custom assets and the statistics (e.g., objects and buckets). The customized page can be sent from the browser application to the client device (e.g., the user) or to the account control manager.

Figure 8:
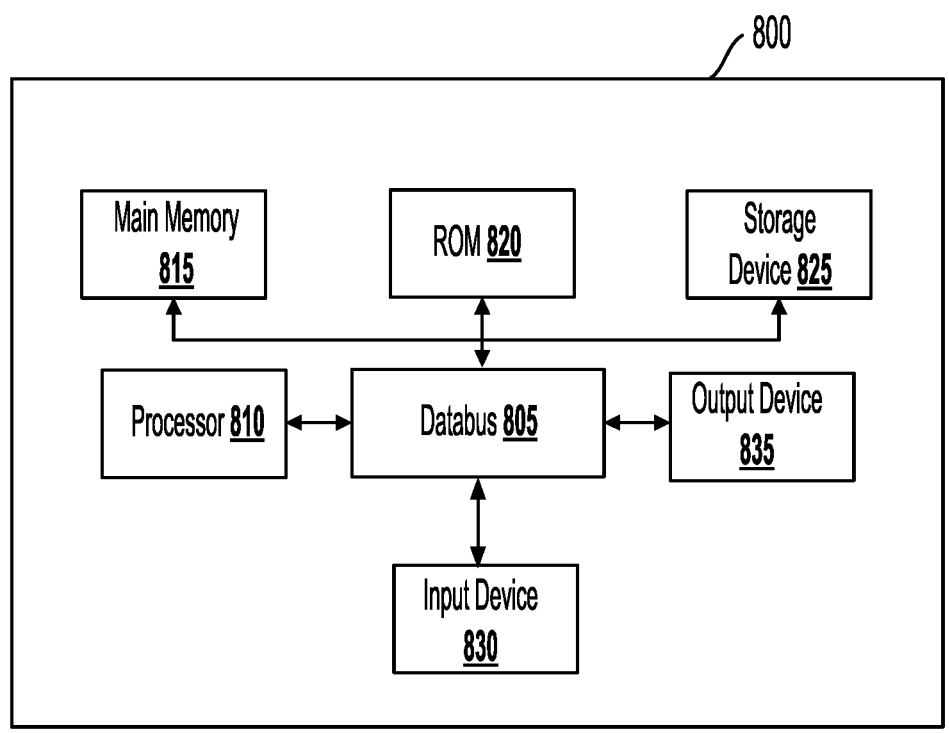
FIG. 8 is a block diagram of an example computing system an architecture that can be employed to implement elements of the systems and methods described and illustrated herein.

FIG. 8 depicts an example block diagram of a computing system 800, also referred to as the computing device 800, which can be included, deployed or coupled with any device performing functions discussed herein. Computing system 800 can be included, for example, on one or more servers or devices providing the functionality of the CSM 102, MSP 110, TPCSM 130 or client 140. Computing system 800 can include or be used in conjunction with any data or information processing, communication, or any functions discussed in connection with FIGS. 1-5 or any actions or acts discussed in connection with FIGS. 6-7.

Computing system 800 can include one or more data buses 805 for conducting signals, data or information between one or more processors 810, main memories 815, read only memories (ROM) 820, storage devices 825, input devices 830 or output devices 835. A data bus 805 can include data lines, wiring, conducting lines or a network or wired or wireless signals for exchanging data between the components of the computing system 800.

Computing system 800 can also include one or more processors 810 (e.g., controllers, digital signal processors, central processing units or otherwise processing circuits) that can be coupled or integrated with the data bus 805 to process data or information that can be stored in various types of memory circuits on the computing system 800.

Computing system 800 can store instructions, data (e.g., client data 126, statistics 106, domain identifiers 122, client assets 132 or any other data or information) in various types and forms of memory or storage devices. For example, computing system 800 can store data in at least one main memory 815. Main memory 815 can include a random access memory (RAM), such as a dynamic RAM (DRAM) or static RAM (SRAM), or any other type of RAM memory, which can be used for dynamic data storage. Main memory 815 can be coupled to the data bus 805 to exchange stored information, instructions or data to with the processor 810 or other computing system components (e.g., input device 830 or output device 835). Main memory 815 can be used for storing data, instructions or information during execution of instructions by the processor 710. Computing system 800 can further include at least one read only memory (ROM) 820 or other static storage device coupled to the data bus 805 for storing static information, such as computer code, executable functions, data or instructions that can be used by the processor 810. A storage device 825, such as a solid state device (SSD), flash storage devices, magnetic or optical disks or any other storage devices can be coupled to the data bus 805 to store information, data, computer code or instructions.

Computing system 800 can include one or more input devices 830 and output devices 835. An output device 835 that can be coupled with other computing system 800 components via the data bus 805. Output device 835 can include any type and form of device for providing output from the computing system 800, including for example a display (e.g., an OLED, LCD or other display) for displaying information to a user, speakers for outputting sound data, printers for printing information, projectors, network interface devices for communicating data over a network or any other type of output device 835 that can output information from the computing system 800. An input device 830, such as a physical or a display keyboard, a touch display, a voice interface, mouse or cursor control device, a microphone or any other data or information input device. Input device 830 can be coupled to the data bus 805 for exchanging information, instructions and commands with the processor 810.

The processes, systems and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. Hard-wired circuitry can be used in place of or in combination with software instructions together with the systems and methods described herein. Systems and methods described herein are not limited to any specific combination of hardware circuitry and software.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system for providing a customized cloud storage report comprising:
   one or more processors coupled with memory to:
   receive, by a cloud storage manager providing cloud storage to a managed service provider having a client, a request pertaining to a report on use of the cloud storage of the cloud storage manager by the client of the managed service provider providing the cloud storage to the client, the request including a domain identifier associated with the managed service provider and a client identifier identifying the client;
   transmit, by the cloud storage manager responsive to the received request on use of the cloud storage by the client, a request for a custom asset associated with the domain identifier associated with the managed service provider to a remote server storing the custom asset provided by the managed service provider;
   receive, from the remote server, the requested custom asset associated with the domain identifier;
   request, from a database of the cloud storage via an application programming interface (API) call using the client identifier, information on usage of the cloud storage by the client;
   receive, from the database responsive to the API call, data corresponding to a first storage amount of client information stored on the cloud storage, a second storage amount of client information deleted from the cloud storage within a retention period and a third storage amount of client information deleted from the cloud storage outside of the retention period;
   identify, by the cloud storage manager, a rate for resource utilization corresponding to the managed service provider;
   determine, by the cloud storage manager, an amount of resource utilized by the client according to the rate for resource utilization and an amount of data including the first storage amount and the second storage amount;
   generate, by the cloud storage manager responsive to the request and based on the first storage amount and the second storage amount of the cloud storage, the report including retrieved custom assets of the managed service provider and the data corresponding to the first storage amount and the second storage amount; and
   send, by the cloud storage manager on behalf of the managed service provider, the report to the client, the report including the amount of resource utilized by the client and the third storage amount.

2. The system of claim 1, wherein the one or more processors:
   receive, by the cloud storage manager from the client, the request directed to the managed service provider and pertaining to the report corresponding to a time period; and
   send, by the cloud storage manager, responsive to the request from the client and on behalf of the managed service provider, the report to the client, the report corresponding to the time period and indicating an amount of the data including the first storage amount and the second storage amount.

3. The system of claim 1, wherein the one or more processors:
   receive, by the cloud storage manager from the managed service provider, the request pertaining to the report corresponding to a time period; and
   send, by the cloud storage manager on behalf of the managed service provider, the report to the client, the report corresponding to the time period and indicating an amount of the data including the first storage amount and the second storage amount.

4. The system of claim 1, wherein the one or more processors:
   identify, by the cloud storage manager, a second rate for resource utilization corresponding to a plurality of clients of the managed service provider, the plurality of clients including the client;
   determine, by the cloud storage manager, a second amount of resource utilized by the client according to the second rate for resource utilization and an amount of data including the first storage amount and the second storage amount; and
   send, by the cloud storage manager, the report including the second amount of resource utilized by the client.

5. The system of claim 1, wherein the one or more processors:
   send, by the cloud storage manager to the client, the report via the managed service provider, the report configured to include a logo of the managed service provider.

6. The system of claim 1, wherein the amount of resource is determined based on the first storage amount and the second storage amount and not based on the third storage amount.

7. The system of claim 1, wherein the one or more processors:

transmit, by the cloud storage manager, the request to the remote server via an
API call corresponding to the custom asset; and
receive, by the cloud storage manager from the remote server, the custom asset responsive to the API call corresponding to the custom asset.

8. A method of providing a customized cloud storage report comprising:
receiving, by one or more processors of a cloud storage manager providing cloud storage to a managed service provider having a client, a request pertaining to a report on use of the cloud storage of the cloud storage manager by the client of the managed service provider providing the cloud storage to the client, the request including a domain identifier associated with the managed service provider and a client identifier identifying the client;
transmitting, by the one or more processors responsive to the received request on use of the cloud storage by the client, a request for a remote server custom asset associated with the domain identifier associated with the managed service provider to a storing the custom asset provided by the managed service provider;
receiving, by the one or more processors from the remote server, the requested custom asset associated with the domain identifier;
requesting, by the one or more processors from a database of the cloud storage via an
application programming interface (API) call using the client identifier, information on usage of the cloud storage by the client;
receiving, by the one or more processors from the database responsive to the API call, data corresponding to a first storage amount of client information stored on the cloud storage, a second storage amount of client information deleted from the cloud storage within a retention period and a third storage amount of client information deleted from the cloud storage outside of the retention period;
identifying, by the one or more processors, a rate for resource utilization corresponding to the managed service provider;
determining, by the one or more processors, an amount of resource utilized by the client according to the rate for resource utilization and an amount of data including the first storage amount and the second storage amount;
generating, by the one or more processors responsive to the request and based on the first storage amount and the second storage amount of the cloud storage, the report including retrieved custom assets of the managed service provider and the data corresponding to the first storage amount and the second storage amount; and
sending, by the one or more processors of the cloud storage manager on behalf of the managed service provider, the report to the client, the report including the amount of resource utilized by the client and the third storage amount.

9. The method of claim 8, comprising:
receiving, by the one or more processors from the client, the request directed to the managed service provider and pertaining to the report corresponding to a time period; and
sending, by the one or more processors on behalf of the managed service provider, the report to the client, the report corresponding to the time period and indicating an amount of the data including the first storage amount and the second storage amount.

10. The method of claim 8, comprising:
receiving, by the one or more processors from the managed service provider, the request pertaining to the report corresponding to a time period; and
sending, by the one or more processors on behalf of the managed service provider, the report to the client, the report corresponding to the time period and indicating an amount of the data including the first storage amount and the second storage amount.

11. The method of claim 8, comprising:
identifying, by the one or more processors, a second rate for resource utilization corresponding to a plurality of clients of the managed service provider, the plurality of clients including the client;
determining, by the one or more processors, a second amount of resource utilized by the client according to the second rate for resource utilization and an amount of data including the first storage amount and the second storage amount; and
sending, by the one or more processors, the report including the second amount of resource utilized by the client.

12. The method of claim 8, comprising:
sending, by the one or more processors to the client, the report via the managed service provider, the report configured to include a logo of the managed service provider.

13. The method of claim 8, wherein the amount of resource is determined based on the first storage amount and the second storage amount and not based on the third storage amount.

14. The method of claim 8, comprising:
transmitting, by the one or more processors, the request to the remote server via an API call corresponding to the custom asset; and
receiving, by the one or more processors from the remote server, the custom asset responsive to the API call corresponding to the custom asset.

15. A non-transitory computer-readable medium comprising instructions that, when executed by one or more processors of a cloud storage manager, cause the one or more processors to:
receive, by the cloud storage manager providing cloud storage to a managed service provider having a client, a request pertaining to a report on use of the cloud storage of the cloud storage manager by the client of the managed service provider providing the cloud storage to the client, the request including a domain identifier associated with the managed service provider and a client identifier identifying the client;
transmit, by the cloud storage manager responsive to the received request on use of the cloud storage by the client, a request for a custom asset associated with the domain identifier associated with the managed service provider to a remote server storing the custom asset provided by the managed service provider;
receive, from the remote server, the requested custom asset associated with the domain identifier;
request, from a database of the cloud storage via an application programming interface (API) call using the client identifier, information on usage of the cloud storage by the client;
receive, from the database responsive to the API call, data corresponding to a first storage amount of client information stored on the cloud storage, a second storage amount of client information deleted from the cloud storage within a retention period and a third storage amount of client information deleted from the cloud storage outside of the retention period;

identify, by the cloud storage manager, a rate for resource utilization corresponding to the managed service provider;

determine, by the cloud storage manager, an amount of resource utilized by the client according to the rate for resource utilization and an amount of data including the first storage amount and the second storage amount;

generate, by the cloud storage manager responsive to the request and based on the first storage amount and the second storage amount of the cloud storage, the report including retrieved custom assets of the managed service provider and the data corresponding to the first storage amount and the second storage amount; and send, on behalf of the managed service provider, the report to the client, the report including the amount of resource utilized by the client and the third storage amount.

16. The non-transitory computer-readable medium of claim 15, wherein the instructions cause the one or more processors to:

receive, from the client, the request directed to the managed service provider and pertaining to the report corresponding to a time period; and send, responsive to the request from the client and on behalf of the managed service provider, the report to the client, the report corresponding to the time period and indicating an amount of the data including the first storage amount and the second storage amount.

17. The non-transitory computer-readable medium of claim 15, wherein the instructions cause the one or more processors to:

receive, from the managed service provider, the request pertaining to the report corresponding to a time period; and send, on behalf of the managed service provider, the report to the client, the report corresponding to the time period and indicating an amount of the data including the first storage amount and the second storage amount.

18. The non-transitory computer-readable medium of claim 15, wherein the instructions cause the one or more processors to:

identify a second rate for resource utilization corresponding to a plurality of clients of the managed service provider, the plurality of clients including the client;

determine a second amount of resource utilized by the client according to the second rate for resource utilization and an amount of data including the first storage amount and the second storage amount; and send the report including the second amount of resource utilized by the client.

19. The non-transitory computer-readable medium of claim 15, wherein the instructions cause the one or more processors to:

send, to the client, the report via the managed service provider, the report configured to include a logo of the managed service provider.

20. The non-transitory computer-readable medium of claim 15, wherein the amount of resource is determined based on the first storage amount and the second storage amount and not based on the third storage amount.

* * * * *